(12) United States Patent
Prince et al.

(10) Patent No.: US 11,196,497 B2
(45) Date of Patent: Dec. 7, 2021

(54) SYSTEM AND METHOD FOR MITIGATING PLATFORM MOTION IN A COMMUNICATIONS SYSTEM

(71) Applicant: RAYTHEON COMPANY, Waltham, MA (US)

(72) Inventors: Gregory B. Prince, Marlborough, MA (US); Thomas E. Gardiner, St. Petersburg, FL (US); Steven J. Howard, Ashland, MA (US); Christopher S. Joines, Hudson, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/816,139

(22) Filed: Mar. 11, 2020

(65) Prior Publication Data
US 2021/0288737 A1    Sep. 16, 2021

(51) Int. Cl.
*H04J 3/06*       (2006.01)
*H04B 7/185*      (2006.01)

(52) U.S. Cl.
CPC ........ *H04J 3/0667* (2013.01); *H04B 7/18515* (2013.01); *H04J 3/0644* (2013.01); *H04J 3/0673* (2013.01)

(58) Field of Classification Search
CPC ...... H04J 3/0635; H04J 3/0638; H04J 3/0644; H04J 3/0658; H04J 3/0673; H04J 3/0667;
(Continued)

(56) References Cited

U.S. PATENT DOCUMENTS 3,378,837 A * 4/1968 Graves ................... G01S 11/02
                                                    342/88
5,790,939 A    8/1998 Malcolm et al.
(Continued)

FOREIGN PATENT DOCUMENTS

AU     2003 200 955 B2    7/2005
EP      1 035 666 A2      9/2000
(Continued)

OTHER PUBLICATIONS

Qiao, et al., "The slot synchronization in space-ground integrated data link", Proceedings of SPIE, vol. 10697, Feb. 20, 2018, (pp. 106975J-1-106975J-10).
(Continued)

*Primary Examiner* — Kevin D Mew
(74) *Attorney, Agent, or Firm* — Lewis Roca Rothgerber Christie LLP

(57) ABSTRACT

A system and method for transmitting packets from a transceiver to a repeater in the presence of relative motion between the transceiver and the repeater. In some embodiments, the method includes: adjusting a plurality of transmission times; transmitting each of a plurality of packets, at a respective adjusted transmission time, from the transceiver to the repeater; and retransmitting, by the repeater, each of the packets, at a respective retransmission time, each of the retransmission times being, as a result of the adjusting, more nearly the same as it would have been, in the absence of: the relative motion, and the adjusting.

18 Claims, 10 Drawing Sheets

(58) Field of Classification Search
CPC .. H04J 3/0682; H04B 7/1851; H04B 7/18513; H04B 7/18515
See application file for complete search history.

(56) References Cited

U.S. PATENT DOCUMENTS

| | | | |
|---|---|---|---|
| 5,809,397 A * | 9/1998 | Harthcock | H04B 7/2125 455/13.2 |
| 6,016,322 A | 1/2000 | Goldman | |
| 6,101,213 A | 8/2000 | Van Allen | |
| 6,667,963 B1 | 12/2003 | Rantalainen et al. | |
| 6,674,730 B1 * | 1/2004 | Moerder | H04B 7/2125 370/312 |
| 7,912,164 B2 | 3/2011 | Armstrong et al. | |
| 8,300,610 B2 | 10/2012 | Tsudaka | |
| 9,872,268 B2 | 1/2018 | Vachula et al. | |
| 10,084,535 B1 | 9/2018 | Speidel et al. | |
| 10,361,772 B2 * | 7/2019 | Regunathan | H04B 7/18513 |
| 11,031,999 B1 * | 6/2021 | Liu | H04W 56/006 |
| 2002/0094797 A1 | 7/2002 | Marshall et al. | |
| 2003/0081603 A1 | 5/2003 | Rune | |
| 2003/0092448 A1 | 5/2003 | Forstrom et al. | |
| 2004/0143392 A1 * | 7/2004 | Kilfeather | G01S 5/0036 701/469 |
| 2006/0077981 A1 | 4/2006 | Rogers | |
| 2007/0218931 A1 | 9/2007 | Beadle et al. | |
| 2008/0144734 A1 * | 6/2008 | Dankberg | H04B 7/18517 375/267 |
| 2008/0285627 A1 * | 11/2008 | Bruas | H04B 7/2126 375/134 |
| 2010/0085908 A1 | 4/2010 | Agarwal | |
| 2012/0057479 A1 | 3/2012 | Maruyama et al. | |
| 2012/0201193 A1 | 8/2012 | Sugiyama et al. | |
| 2012/0249366 A1 | 10/2012 | Pozgay et al. | |
| 2013/0170429 A1 | 7/2013 | Yamamoto et al. | |
| 2013/0211780 A1 | 8/2013 | Meador et al. | |
| 2013/0268980 A1 | 10/2013 | Russell | |
| 2013/0315136 A1 * | 11/2013 | Bhaskar | H04B 7/18513 370/316 |
| 2014/0169792 A1 | 6/2014 | Lee et al. | |
| 2014/0225779 A1 * | 8/2014 | Kaufmann | G01S 19/31 342/458 |
| 2015/0078204 A1 | 3/2015 | Thubert et al. | |
| 2015/0138927 A1 * | 5/2015 | Shemesh | G04R 20/14 368/47 |
| 2015/0172197 A1 | 6/2015 | Sun et al. | |
| 2017/0230925 A1 | 8/2017 | Meiyappan et al. | |
| 2017/0289822 A1 * | 10/2017 | Hreha | H04W 72/0413 |
| 2018/0006710 A1 * | 1/2018 | Buer | H04B 7/18521 |
| 2018/0083694 A1 * | 3/2018 | Rajagopalan | H04L 1/1812 |
| 2019/0190806 A1 | 6/2019 | Bhushan et al. | |
| 2019/0215058 A1 * | 7/2019 | Smyth | H04W 16/14 |
| 2019/0280763 A1 * | 9/2019 | Smyth | H04B 7/18513 |
| 2019/0313357 A1 * | 10/2019 | Wang | H04B 7/1851 |
| 2019/0349877 A1 * | 11/2019 | Alasti | H04B 7/18513 |
| 2019/0394770 A1 * | 12/2019 | Wang | H04W 72/0446 |
| 2020/0081131 A1 * | 3/2020 | Kuntz | G01S 19/37 |
| 2020/0153500 A1 * | 5/2020 | Kim | H04W 36/14 |
| 2021/0044371 A1 * | 2/2021 | Chen | H04B 7/204 |

FOREIGN PATENT DOCUMENTS

| | | |
|---|---|---|
| EP | 2 496 030 A1 | 9/2012 |
| EP | 2 555 465 A2 | 2/2013 |
| EP | 2 819 466 A1 | 12/2014 |
| WO | WO 02/01775 A1 | 1/2002 |
| WO | WO 2011/000041 A1 | 1/2011 |
| WO | WO 2018/151202 A1 | 8/2018 |

OTHER PUBLICATIONS

International Search Report for corresponding International Application No. PCT/US2020/053637, filed Sep. 30, 2020, International Search Report dated Jan. 18, 2021 and mailed Jan. 27, 2021 (5 pgs.).
Written Opinion of the International Searching Authority for corresponding International Application No. PCT/US2020/053637, filed Sep. 30, 2020, Written Opinion of the International Searching Authority dated Jan. 27, 2021 (7 pgs.).
Guidotti, et al. "Satellite-enabled LTE systems in LEO Constellations", IEEE International Conference on Communications workshops (ICC Workshops), May 21, 2017 (pp. 876-881).
International Search Report for corresponding International Application No. PCT/US2020/053638, filed Sep. 30, 2020, International Search Report dated Jan. 27, 2021 and mailed Feb. 9, 2021 (5 pgs.).
Written Opinion of the International Searching Authority for corresponding International Application No. PCT/US2020/053638, filed Sep. 30, 2020, Written Opinion of the International Searching Authority dated Feb. 9, 2021 (5 pgs.).
Notice of Allowance in related Patent Application No. 16/814,834, filed Mar. 10, 2020, Notice of Allowance dated Jul. 9, 2021 (14 pgs.).
International Search Report for corresponding International Application No. PCT/US2017/026671, filed Apr. 7, 2017, International Search Report dated Jul. 13, 2017 and mailed Jul. 24, 2017 (3 pgs.).
Written Opinion of the International Searching Authority for corresponding International Application No. PCT/US2017/026671, filed Apr. 7, 2017, Written Opinion of the International Searching Authority dated Jul. 24, 2017 (5 pgs.).
National Institute of Standards and Technology, "Two Way Time Transfer", https://tf.nist.gov/time/twoway.htm, printed Apr. 23, 2020, 2 pages.
"Precision Time Protocol", https://en.wikipedia.org/wiki/Precision_Time_Protocol, edited Apr. 20, 2020, 6 pages.
Unpublished U.S. Appl. No. 16/814,834, filed Mar. 10, 2020.
Wechsler, Jill, "The Role of GPS in Precise Time and Frequency Dissemination", https://ilrs.gsfc.nasa.gov/docs/timing/gpsrole.pdf, GPSWorld Jul./Aug. 1990, 8 pages.

* cited by examiner

SYSTEM AND METHOD FOR MITIGATING PLATFORM MOTION IN A COMMUNICATIONS SYSTEM

FIELD

One or more aspects of embodiments according to the present invention relate to communications systems, and more particularly to a system and method for maintaining synchronization in a communications system.

BACKGROUND

In commercial communications systems (or in military communications systems), it may be advantageous for each of a plurality of transceivers exchanging data to be synchronized, so that, for example, frequency hopping may be performed reliably. In some situations, data may be transmitted between the transceivers via a repeater. Synchronization signals exchanged by the transceivers, may, in the presence of relative motion of the transceivers and the repeater, be affected by changes in propagation delay. Thus, there is a need for a system and method for mitigating platform motion in a communications system.

SUMMARY

According to an embodiment of the present invention, there is provided a method for transmitting packets from a transceiver to a repeater in the presence of relative motion between the transceiver and the repeater, the method including: adjusting a plurality of transmission times; transmitting each of a plurality of packets, at a respective adjusted transmission time, from the transceiver to the repeater; and retransmitting, by the repeater, each of the packets, at a respective retransmission time, each of the retransmission times being, as a result of the adjusting, more nearly the same as it would have been, in the absence of: the relative motion, and the adjusting.

In some embodiments, the method includes: transmitting a first synchronization packet of the plurality of packets from the transceiver to the repeater; transmitting a second synchronization packet of the plurality of packets from the transceiver to the repeater; receiving the first synchronization packet, by the transceiver, from the repeater; receiving the second synchronization packet, by the transceiver, from the repeater; adjusting a third transmission time, based on: the time elapsed between the transmitting of the first synchronization packet from the transceiver to the repeater and the receiving of the first synchronization packet, by the transceiver, from the repeater, the time elapsed between the transmitting the second synchronization packet from the transceiver to the repeater and the receiving the second synchronization packet, by the transceiver, from the repeater; and transmitting a third synchronization packet of the plurality of packets from the transceiver to the repeater at the adjusted third transmission time, the adjusting of the third transmission time reducing the difference between the time the third synchronization packet is received at the repeater and the time at which the third synchronization packet would have been received at the repeater in the absence of: the relative motion, and the adjusting.

In some embodiments, the receiving of the first synchronization packet, by the transceiver, from the repeater, occurs after the transmitting of the second synchronization packet from the transceiver to the repeater.

In some embodiments, the adjusting of the third transmission time includes: predicting the time of receipt of the third synchronization packet by the transceiver from the repeater, in the absence of the adjusting of the third transmission time; and adjusting the third transmission time by a fraction, less than one, of the difference between the predicted time of receipt of the third synchronization packet and the time at which the third synchronization packet would have been received in the absence of: the relative motion, and the adjusting.

In some embodiments, the adjusting of the third transmission time includes adjusting the third transmission time in accordance with the equation $t_{t3}=t_{tn0}-\frac{1}{2}(t_{r3e}-t_{r30})$ wherein: $t_{t3}$ is the adjusted third transmission time, $t_{t30}$ is the unadjusted third transmission time, $t_{r3e}$ is the predicted time of receipt of the third synchronization packet by the transceiver from the repeater, if transmitted at the unadjusted third transmission time, and $t_{r30}$ is the time at which the third pulse would be received in the absence of: the relative motion, and the adjusting.

In some embodiments, the predicting of the time of receipt of the third synchronization packet by the transceiver from the repeater includes: estimating, with an estimator, a plurality of elements of a state vector, based on: the time elapsed between the transmitting of the first synchronization packet from the transceiver to the repeater and the receiving of the first synchronization packet, by the transceiver, from the repeater, and the time elapsed between the transmitting the second synchronization packet from the transceiver to the repeater and the receiving the second synchronization packet, by the transceiver, from the repeater; and predicting the time of receipt of the third synchronization packet by the transceiver from the repeater based on one or more elements of the state vector, the elements of the state vector being parameters of a model of the relative motion.

In some embodiments, the estimator is a Kalman filter.

In some embodiments, the adjusting of the third transmission time includes adjusting a rate of a transmit clock of the transceiver.

In some embodiments, the method further includes: adjusting a fourth transmission time; and transmitting a data packet from the transceiver to the repeater at the fourth transmission time, the adjusting of the fourth transmission time reducing the difference between the time the data packet is received at the transceiver and the time at which the data packet would have been received in the absence of: the relative motion, and the adjusting.

In some embodiments, the adjusting of the fourth transmission time includes adjusting a rate of a transmit clock of the transceiver.

According to an embodiment of the present invention, there is provided a system for transmitting packets from a transceiver to a repeater in the presence of relative motion between the transceiver and the repeater, the system including: a transceiver configured to transmit a plurality of packets; and a repeater configured to retransmit each received packet, at a respective retransmission time, the transceiver including a processing circuit configured to: adjust a plurality of transmission times; and transmit each of a plurality of packets, at a respective adjusted transmission time, from the transceiver to the repeater, each of the retransmission times for the plurality of packets being, as a result of the adjusting, more nearly the same as it would have been, in the absence of: the relative motion, and the adjusting.

In some embodiments, the processing circuit is configured to: cause the transceiver to transmit a first synchronization packet of the plurality of packets to the repeater; cause the transceiver to transmit a second synchronization packet of the plurality of packets to the repeater; and after: receiving the first synchronization packet, by the transceiver, from the repeater; and receiving the second synchronization packet, by the transceiver, from the repeater: adjust a third transmission time, based on: the time elapsed between the transmitting of the first synchronization packet from the transceiver to the repeater and the receiving of the first synchronization packet, by the transceiver, from the repeater, the time elapsed between the transmitting the second synchronization packet from the transceiver to the repeater and the receiving the second synchronization packet, by the transceiver, from the repeater; and cause the transceiver to transmit a third synchronization packet of the plurality of packets from the transceiver to the repeater at the adjusted third transmission time, the adjusting of the third transmission time reducing the difference between the time the third synchronization packet is received at the repeater and the time at which the third synchronization packet would have been received at the repeater in the absence of: the relative motion, and the adjusting.

In some embodiments, the receiving of the first synchronization packet, by the transceiver, from the repeater, occurs after the transmitting of the second synchronization packet from the transceiver to the repeater.

In some embodiments, the adjusting of the third transmission time includes: predicting the time of receipt of the third synchronization packet by the transceiver from the repeater, in the absence of the adjusting of the third transmission time; and adjusting the third transmission time by a fraction, less than one, of the difference between the predicted time of receipt of the third synchronization packet and the time at which the third synchronization packet would have been received in the absence of: the relative motion, and the adjusting.

In some embodiments, the adjusting of the third transmission time includes adjusting the third transmission time in accordance with the equation $t_{t3} = t_{tm0} - \frac{1}{2}(t_{r3e} - t_{r30})$ wherein: $t_{t3}$ is the adjusted third transmission time, $t_{t30}$ is the unadjusted third transmission time, $t_{r3e}$ is the predicted time of receipt of the third synchronization packet by the transceiver from the repeater, if transmitted at the unadjusted third transmission time, and $t_{r30}$ is the time at which the third pulse would be received in the absence of: the relative motion, and the adjusting.

In some embodiments, the predicting of the time of receipt of the third synchronization packet by the transceiver from the repeater includes: estimating, with an estimator, a plurality of elements of a state vector, based on: the time elapsed between the transmitting of the first synchronization packet from the transceiver to the repeater and the receiving of the first synchronization packet, by the transceiver, from the repeater, and the time elapsed between the transmitting the second synchronization packet from the transceiver to the repeater and the receiving the second synchronization packet, by the transceiver, from the repeater; and predicting the time of receipt of the third synchronization packet by the transceiver from the repeater based on one or more elements of the state vector, the elements of the state vector being parameters of a model of the relative motion.

In some embodiments, the estimator is a Kalman filter.

In some embodiments, the adjusting of the third transmission time includes adjusting a rate of a transmit clock of the transceiver.

In some embodiments, the processing circuit is further configured to: adjust a fourth transmission time; and cause the transceiver to transmit a data packet from the transceiver to the repeater at the fourth transmission time, the adjusting of the fourth transmission time reducing the difference between the time the data packet is received at the transceiver and the time at which the data packet would have been received in the absence of: the relative motion, and the adjusting.

In some embodiments, the adjusting of the fourth transmission time includes adjusting a rate of a transmit clock of the transceiver.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for mitigating platform motion in a communications system provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1A:
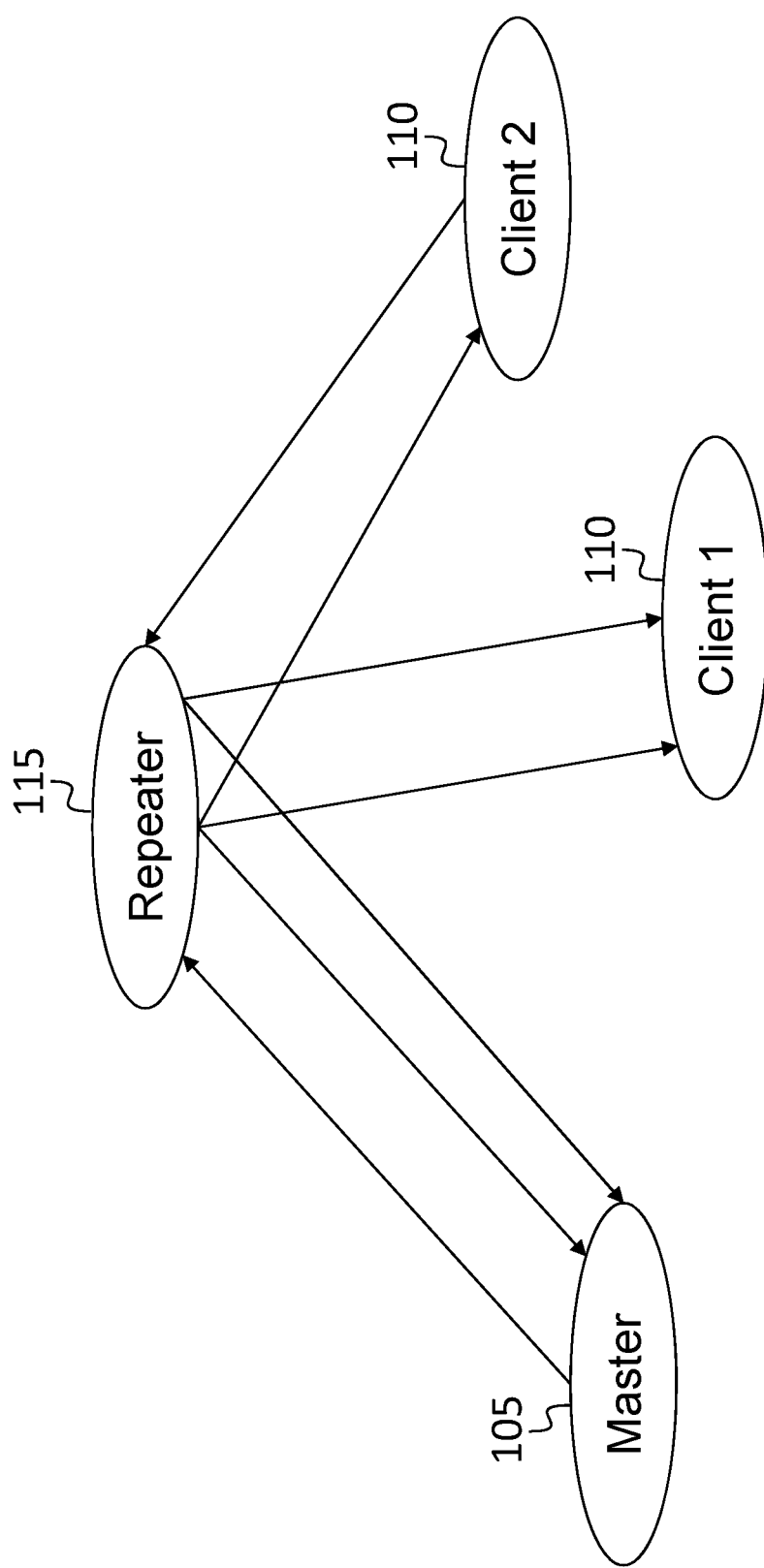
FIG. 1A is a schematic drawing of a communications system, according to an embodiment of the present invention.

Referring to FIG. 1A, in some embodiments, a communications network includes a master transceiver 105, one or more client transceivers 110, and a satellite. The satellite may operate as a repeater 115, or "bent pipe", and may simply retransmit any signals it receives with nominal (and substantially constant) delay. Each of the transceivers may transmit data to the repeater 115, and each of the transceivers may receive the data retransmitted by the repeater 115 (whether or not the retransmitted data were initially transmitted to the repeater 115 by the receiving transceiver or by another transceiver).

The repeater 115 may be a spacecraft orbiting the earth outside of the atmosphere, or it may be any other stationary or moving repeater, e.g., a repeater on an unmanned aerial vehicle (UAV). One or more of the transceivers may be on a moving platform (e.g., an aircraft or a ship). In some embodiments, the system operates in the presence of relative motion between the master transceiver and the repeater 115, and also in the presence of relative motion between each of the client transceivers and the repeater 115.

The communications may be a frequency hopping system or a time-division multiplexed system, or a hybrid system employing both time-division multiplexing and frequency hopping. In such a system, transmissions may occur during pre-defined time slots, and a frequency change may occur at some or all of the time slot boundaries. Each time slot may be referred to as a "hop". Some hops may be used to perform synchronization; such hops may be referred to as "synchronization hops" or "sync hops". In some embodiments, frequency hopping is not used, or time-division multiplexing is not used, and transmission units may generally be referred to as "packets", with packets used to perform synchronization being referred to as "synchronization packets" and other packets being referred to as "data packets".

Figure 1B:
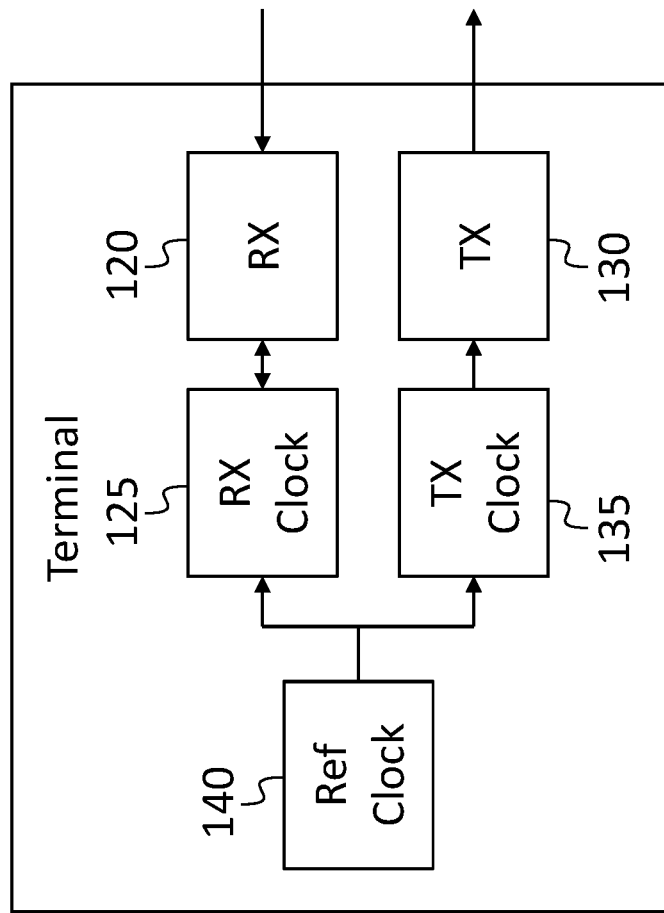
FIG. 1B is a block diagram of a transceiver, according to an embodiment of the present invention.

Referring to FIG. 1B, each of the transceivers may include a receiver 120 with a receive clock 125 and a transmitter 130 with a transmit clock 135. The respective rates of the transmit clock 135 and the receive clock 125 may be adjusted during operation to compensate for changes on propagation delay caused by the relative motion of the transceivers and the repeater. For example, the receive clock 125 may be adjusted so that, even in the presence of the relative motion of the transceivers and the repeater, the receive frequency (e.g., the frequency of a local oscillator employed by the receiver) may switch at time slot boundaries. Each of the transmit clock 135 and the receive clock 125 may be implemented, for example, in a synchronous digital circuit, using an accumulator and an increment register. During each cycle of a reference clock 140, the contents of the increment register may be added to the accumulator. The rolling over of the respective accumulator may start a new cycle (or a new half cycle) of the transmit clock 135 or the receive clock 125. The rate of such a clock may be modified by writing a different value to the increment register. The offset of such a clock may also be adjustable, e.g., by writing a modified value to the accumulator.

Synchronization packets may be transmitted according to a predetermined schedule, which may be available to all of the transceivers. Each synchronization packet may include (e.g., consist of) a predetermined bit pattern, allowing any transceiver that receives the synchronization packet to determine accurately the extent to which the synchronization packet arrived earlier or later than expected. Any such error, in the time of reception, by the transceiver, of a synchronization packet, may be caused by, e.g., the relative motion of the transceivers and the repeater, or an error in the reference clock 140, or both. Such an error in the time of reception, by the transceiver, of a synchronization packet, may be used to adjust the rate of the receive clock 125 of the transceiver (e.g., by changing the value stored in the increment register).

Figure 1C:
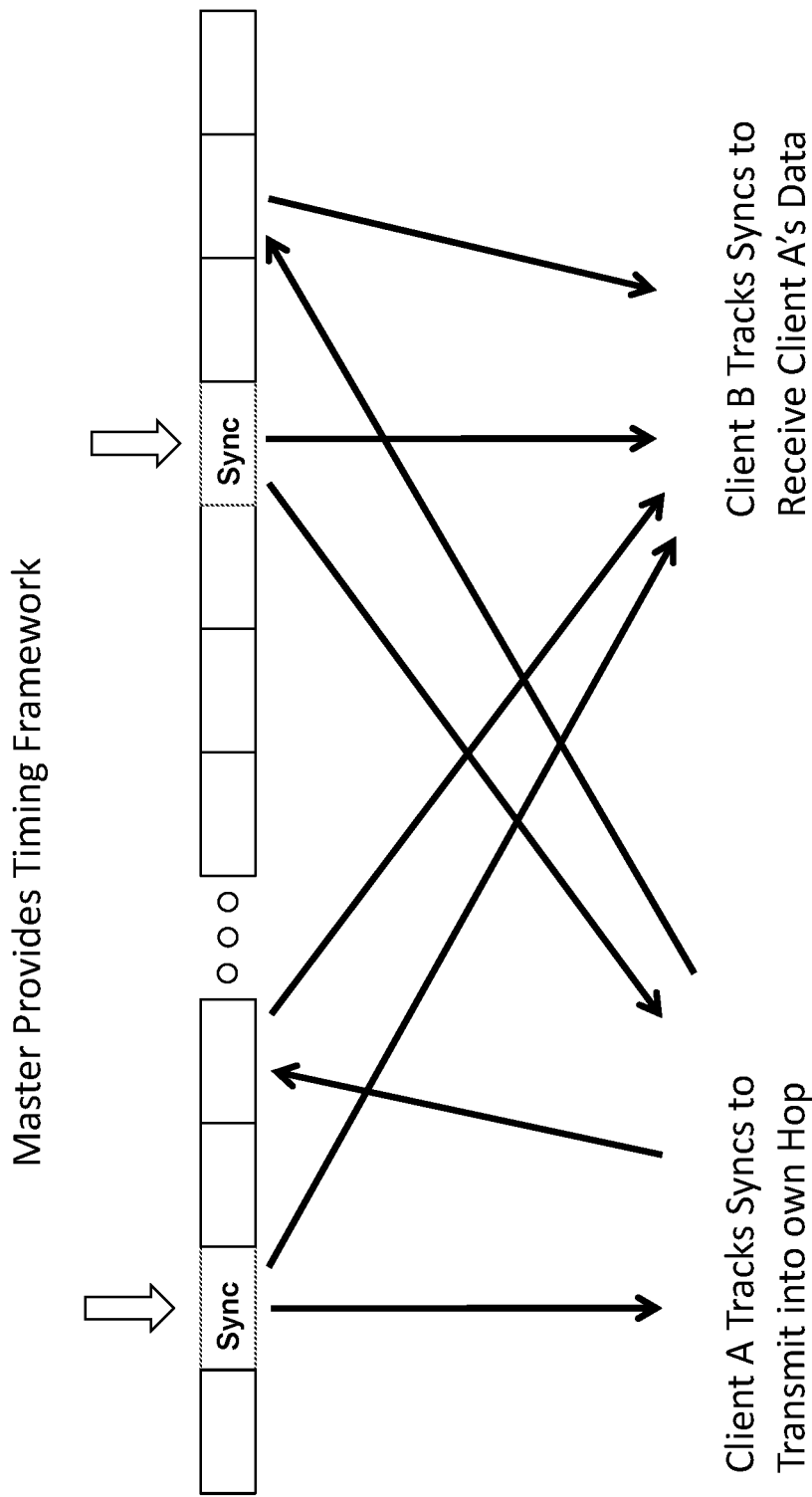
FIG. 1C is a synchronization signal transmission timing diagram, according to an embodiment of the present invention.

Referring to FIG. 1C, in some embodiments the master transceiver 105 provides a timing framework, sending synchronization packets. The timing framework may be a schedule with locations for packets or sequences that may be used to capture timing. The locations of these packets or sequences within this schedule may be known a priori by the master transceiver 105 and by the client transceiver(s) 110. Specific locations may be dedicated to specific client transceiver(s) 110. A packet used to capture timing may also carry some data. The schedule may be fixed or may change over time. A first client transceiver 110 (e.g., Client A) may track the received synchronization packets to transmit, at properly synchronized times, data packets of its own (e.g., in a hybrid system employing both time-division multiplexing and frequency hopping, to transmit a data packet (or "data hop") in a time slot allocated to Client A). A second client transceiver 110 may also track the synchronization packets, to receive, e.g., a data packet transmitted by Client A.

Figure 2A:
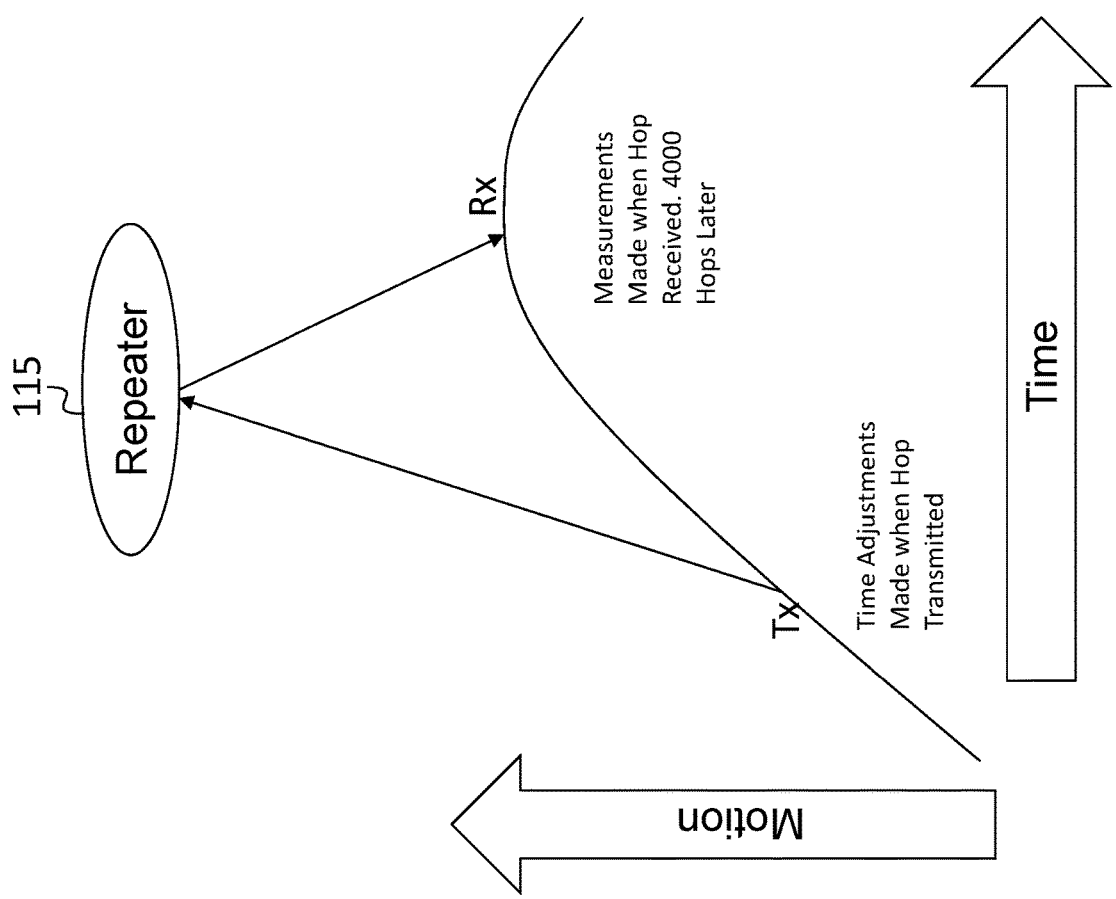
FIG. 2A is a schematic drawing of a communications system, according to an embodiment of the present invention.

In some embodiments, the transmit timing of the master transceiver 105 may be adjusted to compensate for relative motion of the master transceiver 105 and the repeater, so that the timing of the synchronization packets (and of the data packets) retransmitted by the repeater 115 is approximately the same as it would be in the absence of relative motion of the master transceiver 105 and the repeater. Referring to FIG. 2A, the master transceiver 105 may, as mentioned above, transmit a plurality of synchronization packets to the repeater. The master transceiver 105 may then, from the round-trip propagation delay to the repeater 115, of each of the synchronization packets, predict the round-trip propagation delay that, for example, the next synchronization packet to be transmitted by the master transceiver 105 is expected to experience. Based on this prediction, the master transceiver 105 may adjust the transmission time of the next synchronization packet so that it will be retransmitted by the repeater 115 at approximately the same time as if there were no relative motion of the master transceiver 105 and the repeater.

The prediction may be performed by an estimator, e.g., a Kalman filter. The estimator may estimate a plurality of elements of a state vector, based on the time elapsed between the transmitting of each of the plurality of synchronization packets from the master transceiver 105 to the repeater and the receiving of each of the plurality of synchronization packets, by the master transceiver 105, from the repeater. The elements of the state vector may be parameters of a model of the relative motion of the master transceiver 105 and the repeater; for example, the elements of the state vector may include the estimated round-trip delay, the estimated rate of change (i.e., first derivative with respect to time) of the round-trip delay, the estimated second derivative with respect to time of the round-trip delay, the estimated third derivative with respect to time of the round-trip delay, and the like.

The transmission time may then be adjusted by one half of the expected change, from nominal, in the predicted time of reception of the synchronization packet back at the master transceiver 105. A factor of one half may be used, based on the premise that it is the time of retransmission by the repeater (not the time of reception of the synchronization packet back at the master transceiver 105) that ideally is to be made independent of the relative motion of the transceivers and the repeater. In some embodiments the effect of the adjustment may be, or may be approximately, as follows. The time, $t_{tn}$, at which the $n^{th}$ pulse is transmitted (i.e., the adjusted transmission time), may be given by, or may be approximately given by:

$$t_{tn} = t_{m0} - \tfrac{1}{2}(t_{rne} - t_{rn0})$$

where:

$t_{m0}$ is the time at which the $n^{th}$ pulse is scheduled to be transmitted (i.e., the unadjusted transmission time), $t_{me}$ is the time at which the Kalman filter predicts reception of the $n^{th}$ pulse, if transmitted at the scheduled time, and $t_{rn0}$ is the time at which the $n^{th}$ pulse would be received in the absence of the relative motion and in the absence of any adjustments to the transmission time.

This correction may be accomplished in the rate domain (instead of in the time offset domain), as follows (using the adjustability of the rate of the transmit clock 135). Half of the estimated future time rate may be applied to the transmit clock in a counter direction. If the estimated future time rate is expected to be x ns/second (i.e., synchronization packets are expected to be arriving faster), the transmit clock is slowed down by x/2 ns/second.

In some embodiments, half of the estimated future time rate is also applied in the future when the signal is received. A method for doing this is to subtract half of the previously estimated future time rate from the time rate predicted by the tracking loop for the current time. For example, a signal may be transmitted by the master transceiver at a current time $t_0$, that signal may be expected to arrive at the repeater at a future time $t_1$, and the signal retransmitted by the repeater may be expected to be received at the master transceiver at a future time $t_2$. At time $t_0$ the tracking loop is used to predict that at time $t_2$ the propagation time will be decreasing at a rate of x ns/second. At time $t_0$ the transmit clock of the master transceiver is slowed by x/2 ns/second. At time $t_2$ the tracking loop may, for example, predict that the propagation delay of the received signal is currently changing at y ns/second, and at time $t_2$ the receive clock may be sped up by (y−x/2) ns/second.

Figure 2B:
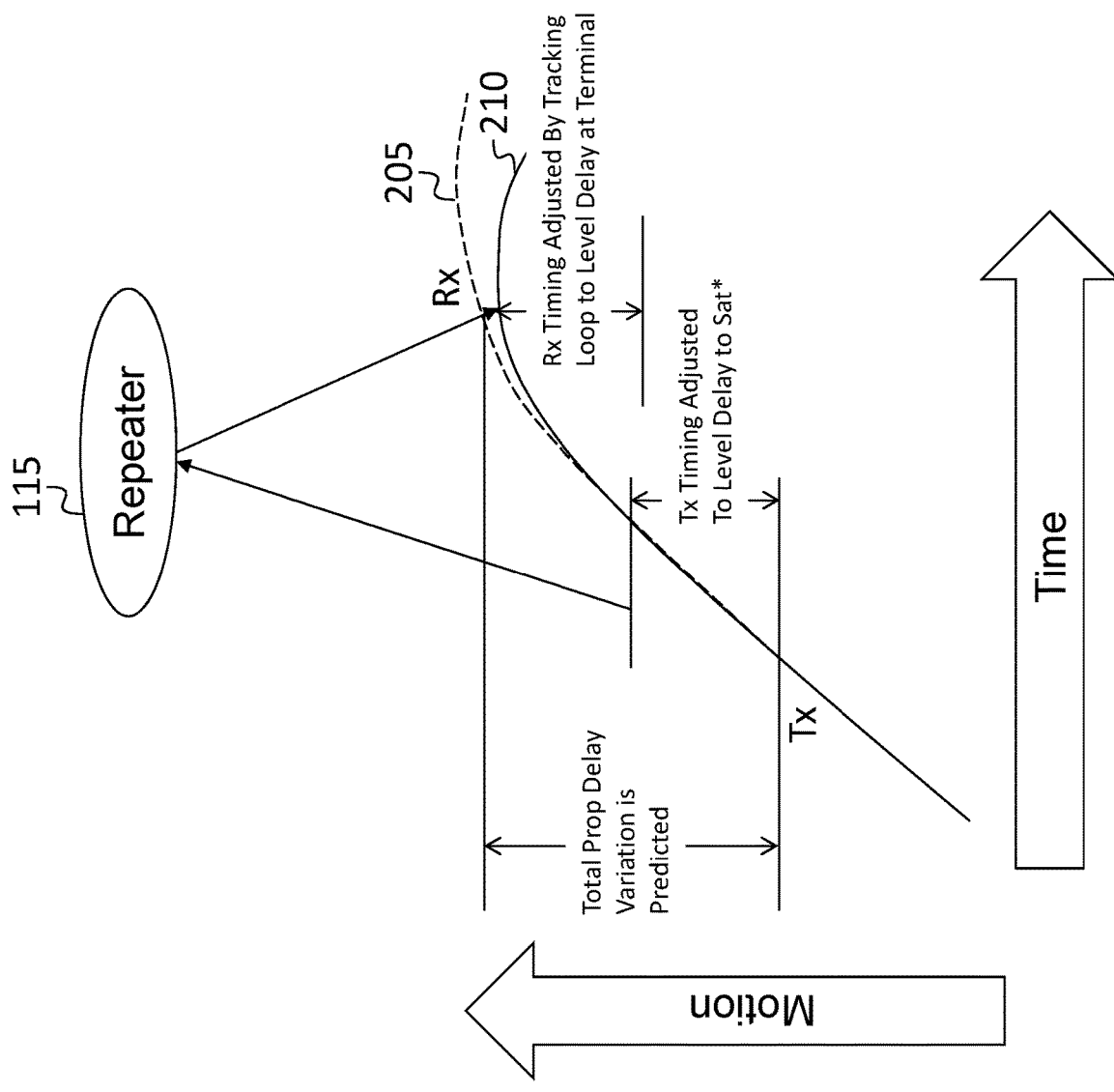
FIG. 2B is a schematic drawing of a communications system, according to an embodiment of the present invention.

FIG. 2B shows an example of such a method. In FIGS. 2A and 2B, the repeater 115 is stationary, and the master transceiver 105 is illustrated as moving; the analysis and behavior may be similar, however, if instead the repeater 115 is moving, or both are moving. As illustrated in FIG. 2B, the actual motion may not be precisely the same as the predicted motion; though they may differ, however, the variation of the retransmission time at the repeater 115 may nonetheless be less than it would be if no predictive correction were made.

Figure 3:
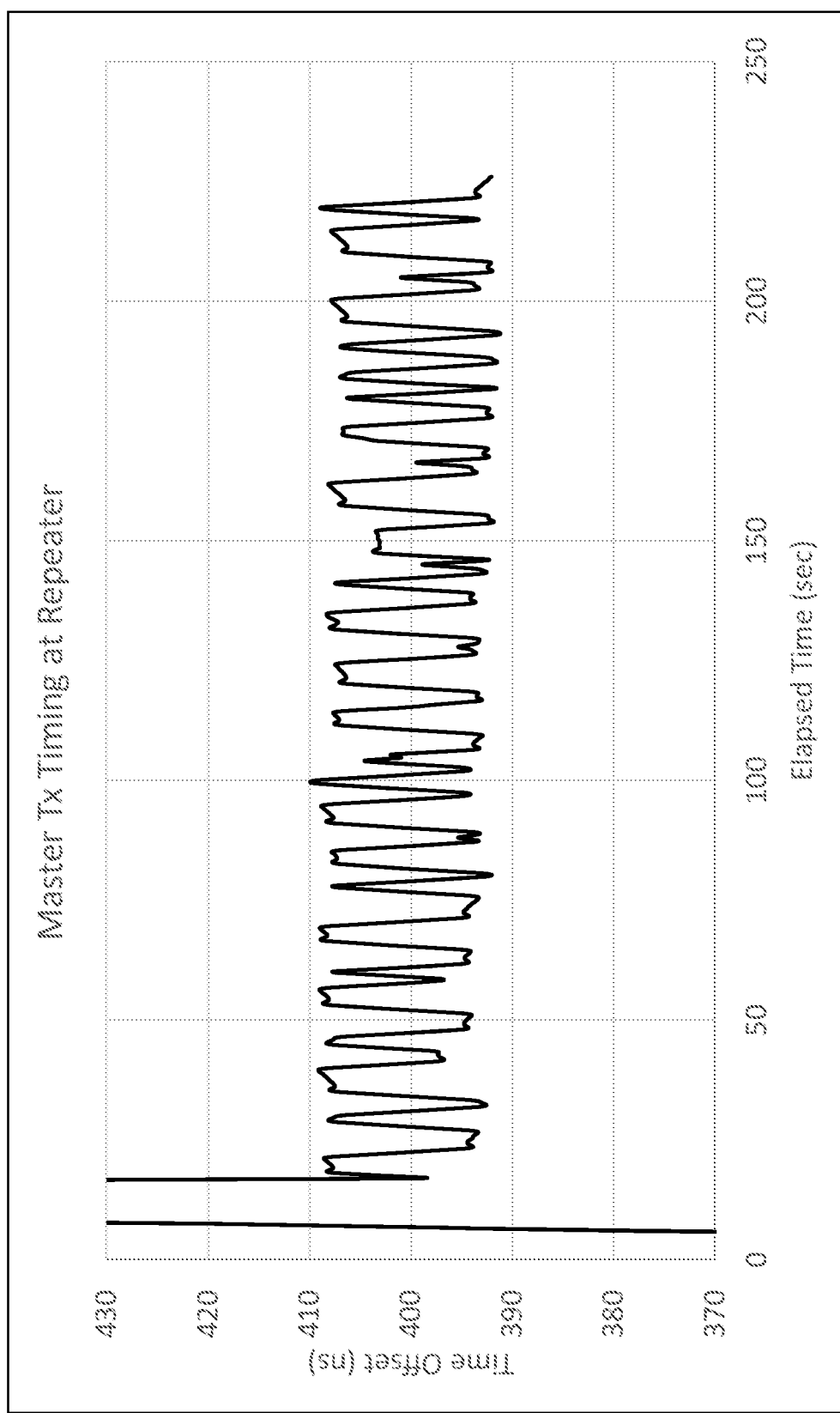
FIG. 3 is a graph of time offset as a function of time, according to an embodiment of the present invention.

FIG. 3 illustrates performance, measured as the variation of the retransmission time (or "time offset") at the repeater 115, as observed in a hardware-in-the loop simulation.

In some embodiments, the reference clock 140 of a client transceiver 110 may be stabilized to the reference clock 140 of the master transceiver 105. In such a system, the reference clock of the master transceiver 105 may be a highly stable, relatively costly clock (e.g., an atomic clock) and the reference clock of the client transceiver 110 may be a relatively inexpensive clock (e.g., a crystal oscillator), which, as a result of being stabilized to the reference clock of the master transceiver 105, may exhibit stability comparable to that of the reference clock of the master transceiver 105.

In operation, the receive clock 125 of the client transceiver 110 may track synchronization packets received from the master transceiver 105. This may result in the rate of the receive clock 125 of the client transceiver 110 being adjusted to compensate for (i) relative motion of the client transceiver 110 and the repeater 115 and (ii) any rate error of the reference clock 140 of the client transceiver 110. Further, in operation, the client transceiver 110 may periodically send "probe" packets to the repeater 115, and receive the retransmitted probe packets from the repeater 115, to measure the round-trip propagation time between the client transceiver 110 and the repeater 115.

The transmit clock 135 of the client transceiver 110 may then be adjusted based on two correction signals, (i) a first correction signal based on the adjusting of the rate of the receive packet trigger generator (in particular, the rate of the transmit clock 135 may be adjusted by the same amount as the receive clock, in the opposite direction); and (ii) a second correction signal, based on the round-trip propagation time between the client transceiver 110 and the repeater 115 (which may be used to adjust the offset of the transmit clock 135). The average of the transmit clock 135 and the receive clock 125 may then have a (low-frequency) stability comparable to that of the reference clock 140 of the master transceiver 105, because the relative motion of the client transceiver 110 and the repeater 115 (which results in equal and opposite adjustments to the respective rates of the receive clock 125 and the transmit clock 135) does not affect the average of the transmit clock 135 and the receive clock 125, and because the average of the transmit clock 135 and the receive clock 125 may be corrected (as a result of the adjustments described above) for any rate error (relative to the rate of the reference clock 140 of the master transceiver 105) in the reference clock 140 of the client transceiver 110.

Figure 4A:
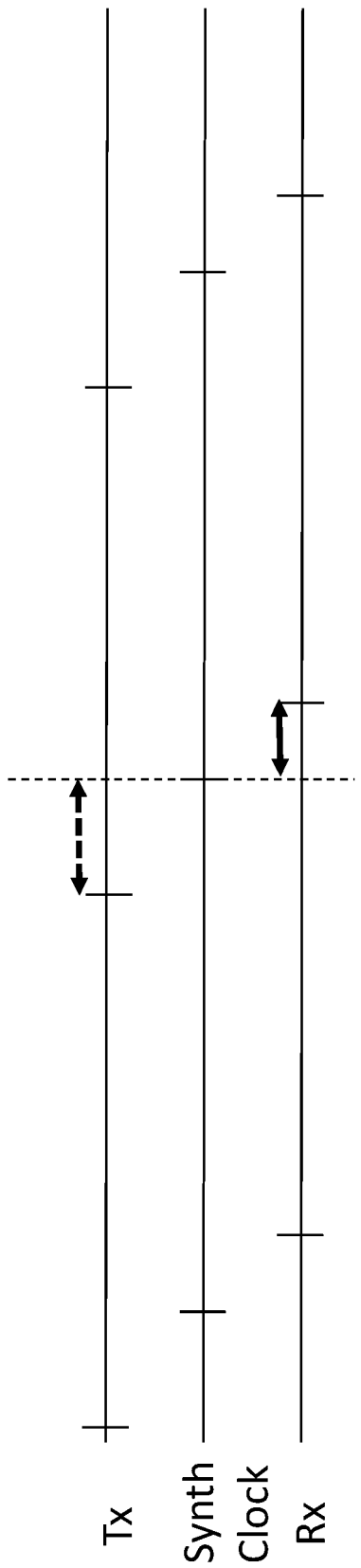
FIG. 4A is a timing diagram, according to an embodiment of the present invention.
Figure 4B:
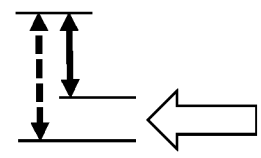
FIG. 4B is a timing diagram, according to an embodiment of the present invention.

FIGS. 4A and 4B illustrate this mode of operation, in which the difference between (i) a synthesized clock (e.g., the reference clock 140 of the client transceiver 110) and (ii) the average of the transmit clock 135 and the receive clock 125 (or, equivalently, the difference between the transmit time stamp (stamped with the synthesized clock) and the receive time stamp (also stamped with the synthesized clock)) is an error signal that may be used, for example, to adjust the rate of the reference clock 140 of the client transceiver 110.

Figure 4C:
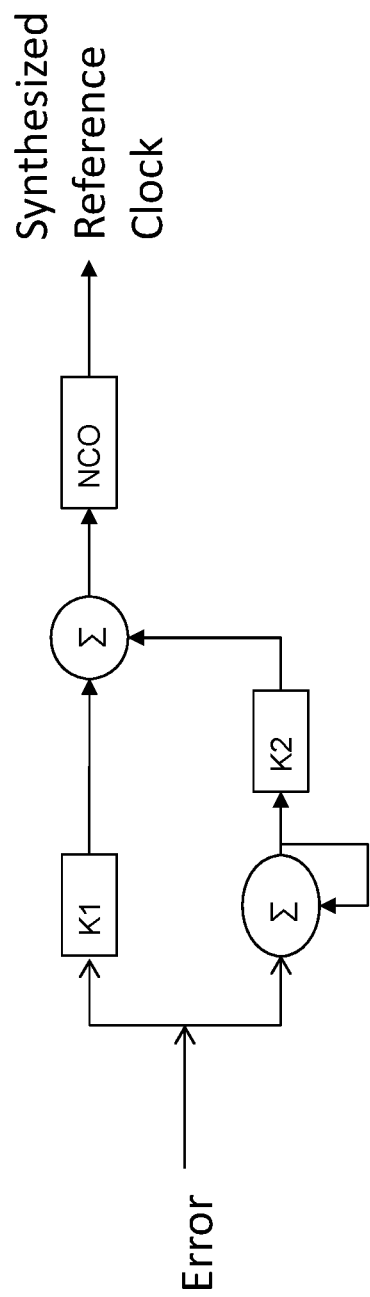
FIG. 4C is a block diagram of portion of a phase locked loop, according to an embodiment of the present invention.
Figure 5A:
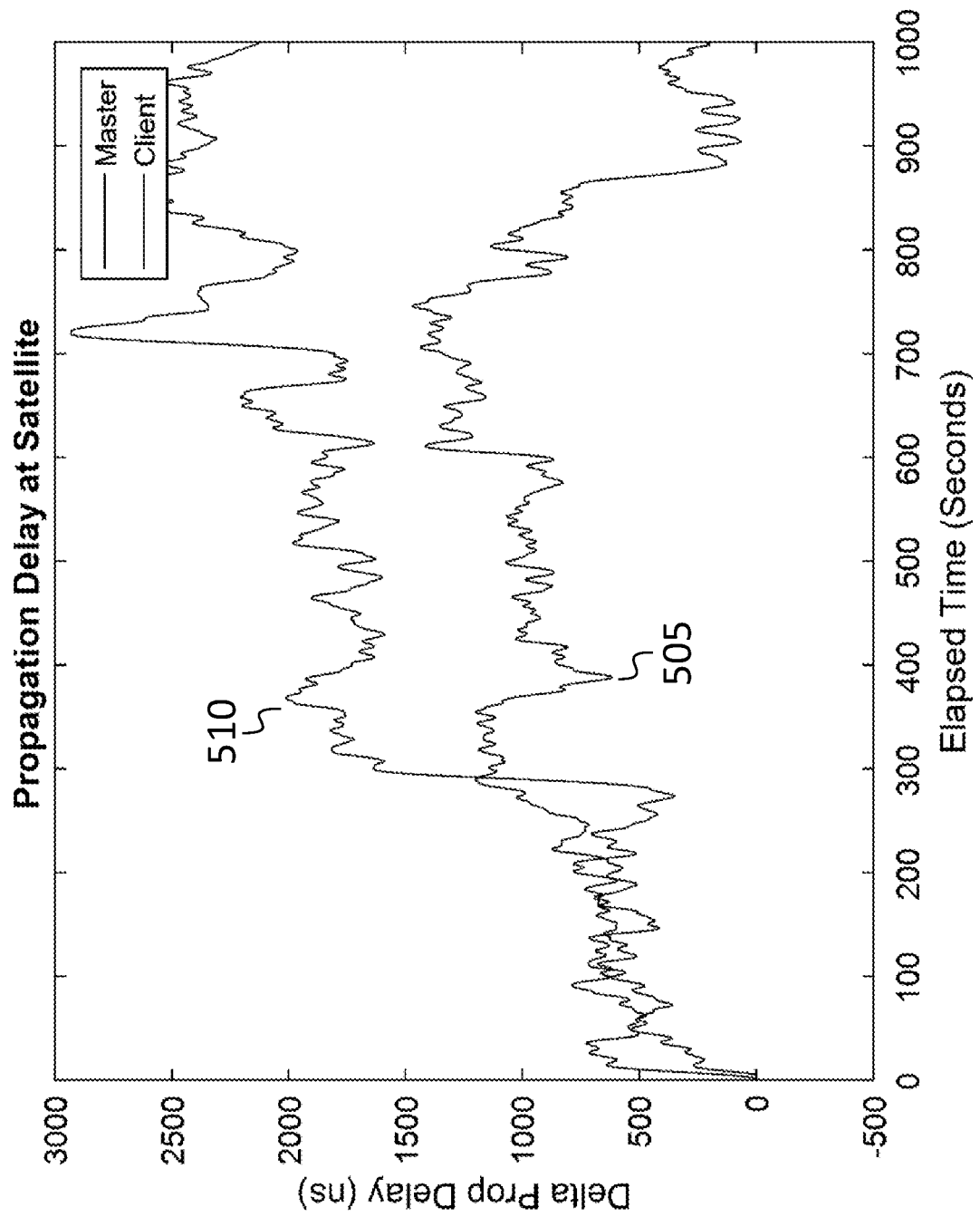
FIG. 5A is a graph of propagation delay as a function of time, according to an embodiment of the present invention.
Figure 5B:
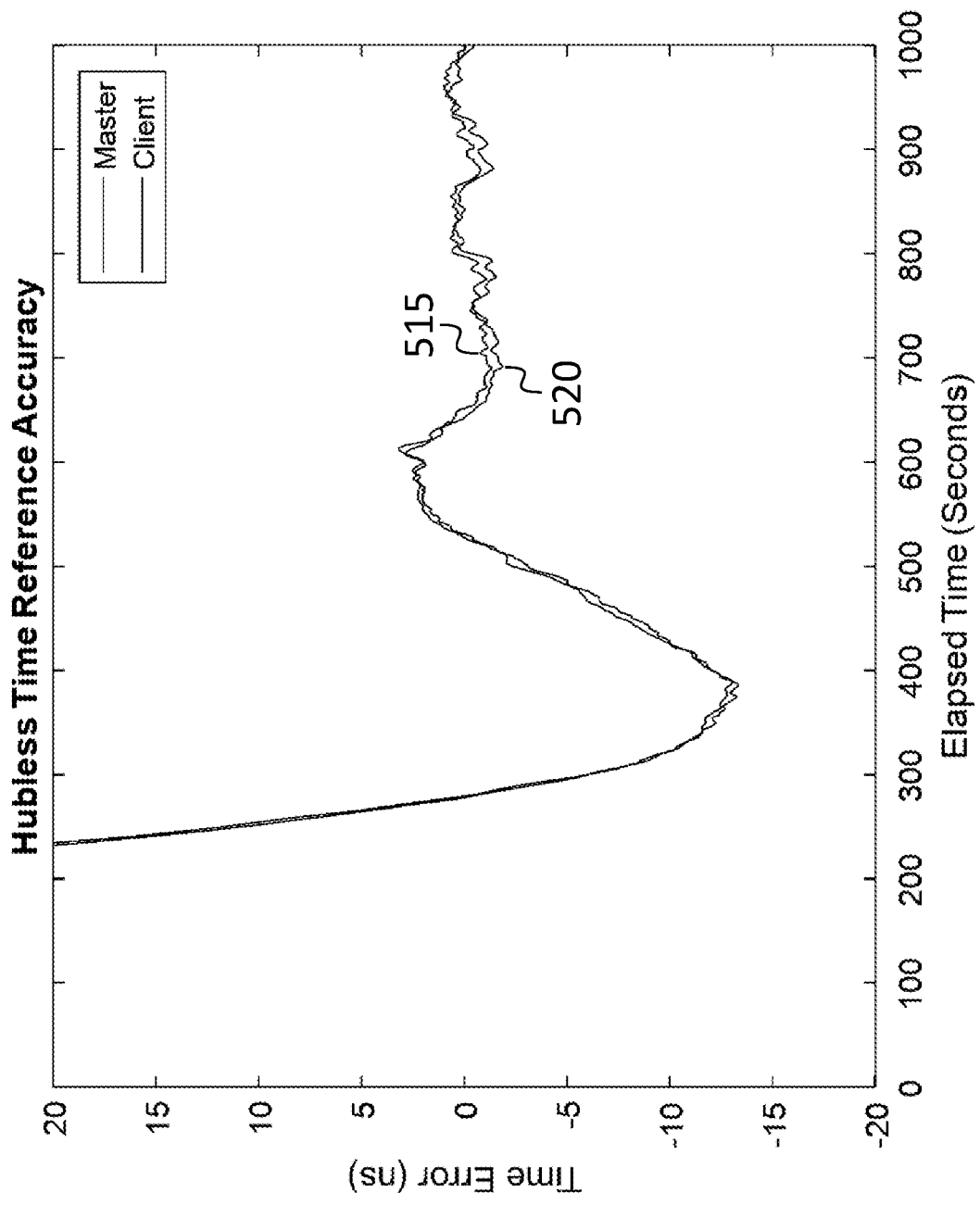
FIG. 5B is a graph of time reference accuracy as a function of time, according to an embodiment of the present invention.

The reference clock 140 of the client transceiver 110, offset by the error signal, may be a clock signal that has stability comparable to that of the reference clock 140 of the master transceiver 105; this signal may however be relatively noisy. As such, as shown in FIG. 4C, the error signal may be used as a part of a phase locked loop in which the reference clock 140 of the client transceiver 110 is the variable-rate oscillator. The error signal may be filtered by a filter that combines two components, a first component that is proportional to the error signal (with the weighting factor K1 as shown), and a second component that is proportional to the integral of the error signal (with the weighting factor K2 as shown). FIG. 5A shows simulated variations in propagation delay between the repeater and (i) (in a first curve 505) the master transceiver, and (ii) (in a second curve 510) a client transceiver. FIG. 5B shows, in a simulation including the stabilization of the reference clock of the client transceiver to the reference clock of the master transceiver, (i) (in a first curve 515) the time error of the master transceiver, and (ii) (in a second curve 520) the time error of the client transceiver.

The methods described herein may be further understood via the code in the code listings below. Each listing is labeled, at the top of the listing, with a filename. Filenames ending in ".m" label code written in the MATLAB™ programming language; the remaining listings are C++ code listings. The MATLAB™ code implements a simulation that includes both some of the methods described above and a simulation environment that simulates, e.g., the relative motion of the terminals and the repeater.

The listing sim01.m includes code for the top-level simulation function. Line 40 instantiates, in the variable em, an instance of the eventMgr (event manager) class (defined in eventMgr.m). The loop extending from line 50 to line 97 sets up the transceivers (or "terminals") to be simulated, adding TxFrame and RxFrame events to the event manager's event queue for each terminal (at lines 64 and 70). Each frame, in the simulation, has a duration of 20 ms and consists of a plurality of hops, and is the level at which synchronization is performed. The simulation then runs (i.e., simulates the passage of time) in the loop extending from line 108 to line 258. The switch statement beginning on line 112 takes appropriate action depending on the destination of the event being processed. If the destination is the satellite (i.e., the repeater, which is identified as destination (dest) number 0) then at line 141 the event is put back into the event queue with a new destination (the master transceiver, identified (on line 140) as destination number 1), and with a time (the time of reception) generated, on line 159, by the motion manager (mm(1), an instance of motionclass, instantiated on line 7 and defined in motionclass.m). Because the repeater 115 is broadcasting to all of the terminals, then a duplicate (or "clone") of the event is (at line 151) placed into the event queue for each of the terminals, each clone having the corresponding terminal as its destination (line 149), and a time generated (on line 150) by the corresponding motion manager.

At line 167 and the lines that follow it, the simulation handles events that are for one of the terminals (i.e., not for the repeater and not for the simulation itself). At line 173, if the event is the receipt of a synchronization packet, then the function handleRxEvent (in handleRxEvent.m) is called. This function causes the receive clock of the terminal to be adjusted based on any discrepancy between the time of reception of the synchronization packet and the expected time of reception of the synchronization packet. Line 184 corresponds to a transition to a new frame in the receiver, e.g., the rolling over of the accumulator of the receive clock of the terminal.

At line 189 the simulation handles a Tx frame event, which occurs when the terminal passes a known time increment such as a frame, e.g., when the accumulator of the transmit clock of the terminal rolls over. A list of hops to be transmitted during the next frame is created (by a call, on line 191, to the function handleTxFrame, in handleTxFrame.m), and (in the loop extending from line 196 to line 209), for each of the hops, an event corresponding to the hop's reception at the repeater 115 is added to the event queue. At lines 210-224, the code is converting time error in Frame #'s into time error in seconds as well as keeping track of the appropriate time shifts based on the applicable terminal in the network.

The listing handleRxEvent.m includes code for simulating the reception by a terminal of a synchronization packet (or "sync", or "synchronization hop"). On lines 12 and 13, a time error (timeErr), that corresponds to the difference between the time of reception of the synchronization packet and the expected time of reception of the synchronization packet, is calculated. On line 14 and 15, simulated noise is added to timeErr to form a simulated measured error (time-Meas). This value is passed to the receive tracker (the simulation of which is implemented in C++ code) at lines 18 and 19.

If the simulation determines on line 32 that the source of the received synchronization packet is the receiving terminal itself, then the synchronization packet is termed a "probe" packet and is used for transmit tracking. The difference between the time of reception of the probe packet and the expected time of reception of the probe packet (represented as a sign (isLate) and a magnitude (errMag)) is passed into the transmit tracker at line 64. The estimated rate of change of the round trip delay is then returned from the Kalman filter (along with the estimated error (the square root of the variance estimated by the Kalman filter)) on line 67.

The listing handleRxFrame.m includes the function handleRxFrame (mentioned above) which includes code for simulating a receive frame boundary (corresponding to the rolling over of the accumulator of the receive clock of the terminal). The receive tracker is called at lines 15 and 16, and the rate of the terminal's transmit clock and receive clock are set, based on the output of the tracker, at lines 24 and 26, respectively. The output of the tracker is one half of the estimated future time rate (with the multiplication by one half being performed on lines 239 and 240 of the listing TrackingLoop.cpp).

The listing trackLib.cpp contains definitions of various functions called by the MATLAB™ code including the function ftLoop_addTimeErrorMeasurement on line 161, the function thoop_loadHwMeasurements on line 186, the function select_tLoop on line 131, the function txTrack_select on line 8, the function txTrack_init on line 20, the function txTrack_getAccuracy on line 46, the function txTrack_calcMeasAccuracy on line 25, the function txTrack_update on line 32, and the function tLoop_processLoop2 on line 213.

As used herein, the word "or" is inclusive, so that, for example, "A or B" means any one of (i) A, (ii) B, and (iii) A and B. As used herein, when a method (e.g., an adjustment) or a first quantity (e.g., an element of a state vector) is referred to as being "based on" a second quantity (e.g., a time interval) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

In some embodiments, methods described herein are performed in the transceivers by one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although limited embodiments of a system and method for mitigating platform motion in a communications system have been specifically described and illustrated herein, many modifications and variations will be apparent to those skilled in the art. Accordingly, it is to be understood that a system and method for mitigating platform motion in a communications system employed according to principles of this invention may be embodied other than as specifically described herein. The invention is also defined in the claims below, and equivalents thereof.

Code listings sim01.m

```
1   function sim01
2   %SIM01 Simulation of Hubless Master node
3   %   Detailed explanation goes here
4   addTerminalLib();
5   loadLib('trackLib');
6   % create motion models for 3 terminals
7   mm(3) = motionClass;
8   mm.init(3,[0,20]); %ship
9   %mm.init(2,[5,1000,2]); % sine
10  nTerm = 2;
11  % create terminals
12  term(nTerm) = terminalClass;
13  % will be tracking satellite time error and terminal time error
14  satCount  = zeros(1,nTerm);
15  termCount = zeros(1,nTerm);
16  satHist  = zeros(5000,nTerm);
17  satTime  = zeros(5000,nTerm);
18  termHist = zeros(5000,nTerm);
19  termTime = zeros(5000,nTerm);
20  delayHist = zeros(5000,nTerm);
```

```
21   delayTime = zeros(5000,nTerm);
22   ltHist   = zeros(5000,1);
23   ltTime   = zeros(5000,1);
24   ltCount  = 0;
25   ltState = 0;
26   ltTimeStamp = 0;
27   lteHist  = zeros(5000,nTerm);
28   lteTime  = zeros(5000,nTerm);
29   lteCount = zeros(1,nTerm);
30   ltErr = 0; % to prevent errors on first pass
31   % define major event types here
32   eventNone     = 0;
33   eventChangeMode = 1;
34   eventTxFrame  = 2;
35   eventRxFrame  = 3;
36   eventLtFrame  = 4;
37   eventTx       = 5;
38   eventRx       = 6; % may not need this anymore
39   eventEnd      = 7;
40   em = eventMgr; % create event manager for simulation
41   % create end event
42   evt = em.getFreeEvent();
43   evt.time = 1000; % End of simulation in seconds
44   evt.eventType = eventEnd;
45   evt.dest = -1; % address to simulation
46
47   em.addEvent(evt);
48
49   % get things setup for each terminal
50   for i = 1:nTerm
51       timeOffset = 2e-6; %4e-6 * (rand - 0.5);
52       term(i).id = i;
53       term(i).rxFrameID = -13;
```

```
54    evt = em.getFreeEvent();
55    if timeOffset > 0
56        evt.time = 0;
57    Else
58        evt.time = -timeOffset;
59        timeOffset = 0;
60    End
61    evt.epochLoc = 1;
62    evt.dest = i;
63    evt.eventType = eventTxFrame;
64    em.addEvent(evt);
65    evt = em.getFreeEvent();
66    evt.time = timeOffset;
67    evt.epochLoc = 1;
68    evt.dest = i;
69    evt.eventType = eventRxFrame;
70    em.addEvent(evt);
71
72    evt = em.getFreeEvent();
73    evt.eventType = eventLtFrame;
74    evt.time = 0;
75    evt.dest = i;
76    em.addEvent(evt);
77
78    % initialize Rx tracker for
79    calllib('trackLib','select_tLoop',i);
80    % shipboard = 4
81    calllib('trackLib','tLoop_init',4, 22.5e9, 0.0);
82    % set propagation delay
83    % don't set to master just yet
84    if i == 1
85        calllib('trackLib','tLoop_setHubless',12,1);
86        term(i).setMode(10); % set Master
```

```
87      else
88          calllib('trackLib','tLoop_setHubless',12,0);
89          term(i).setMode(0); % set idle
90          evt = em.getFreeEvent();
91          evt.eventType = eventChangeMode;
92          evt.parm = 1; % client Rx Pull-in
93          evt.time = 3;
94          evt.dest = i;
95          em.addEvent(evt);
96      end
97  end
98
99  % set up initial state variables
100
101 satBroadcast = true; % save sim time by not sending when other terms are
102                     % not listening
103 %
104 % Event Loop Starts here
105 %
106 simRunning = true;
107
108 while simRunning
109     evt = em.nextEvent();
110
111     % dispatch event to recipient
112     switch evt.dest
113         case -1 % event is for simulation itself
114             if evt.eventType == eventEnd
115                 simRunning = false;
116             else
117                 fprintf('Error - Unexpected event received by sim %d\n',...
118                     evt.eventType);
```

```
119              simRunning = false;
120            end
121          em.freeEvent(evt);
122
123        case 0 % event is for satellite
124          switch evt.eventType
125            case eventRx
126              txTime = em.currentTime;
127              % find ref time
128              refTime = evt.epochLoc * 0.02 + evt.frameLoc * HOP_PERIOD;
129              timeErr = txTime - refTime - 0.12;
130              termID = evt.source;
131              count = satCount(termID) + 1;
132              satCount(termID) = count;
133              satHist(count,termID) = timeErr;
134              satTime(count,termID) = txTime;
135              delayHist(count,termID) = evt.time - evt.parm;
136              delayTime(count,termID) = txTime;
137              % retransmit to terminal 1
138              % reuse same event
139              evt.time = mm(1).termRxTime(txTime);
140              evt.dest = 1;
141              em.addEvent(evt);
142
143              % if broadcasting to all terminals, create new events
144              % for each.
145              if satBroadcast
146                for i = 2:nTerm
147                  newEvt = em.getFreeEvent();
148                  newEvt.clone(evt);
149                  newEvt.dest = i;
150                  newEvt.time = mm(i).termRxTime(txTime);
```

```
151                em.addEvent(newEvt);
152              end
153            end
154          case eventChangeMode
155            if evt.parm == 0
156              satBroadcast = false;
157            else
158              satBroadcast = true;
159            end
160            em.freeEvent(evt);
161          otherwise
162            fprintf('Error - Unexpected event received by satellite %d\n',...
163              evt.eventType);
164            simRunning = false;
165            em.freeEvent(evt);
166        end
167      otherwise % event is for one of the terminals
168        termID = evt.dest;
169        now = evt.time;
170        switch evt.eventType
171          case eventRx
172            % process Rx event
173            [usable,timeErr] = term(termID).handleRxEvent(evt);
174            if usable
175              count = termCount(termID) + 1;
176              termCount(termID) = count;
177              termTime(count,termID) = now;
178              termHist(count,termID) = timeErr;
179            end
180            em.freeEvent(evt)
181          case eventTx
182            % not doing anything with this now - maybe never
```

```
183            em.freeEvent(evt)
184        case eventRxFrame
185            % do Rx frame stuff
186            evt = term(termID).handleRxFrame(evt);
187            % post next Rx Frame Event
188            em.addEvent(evt)
189        case eventTxFrame
190            % do Tx frame stuff
191            [evt, txList] = term(termID).handleTxFrame(evt);
192            % post next Tx frame event
193            em.addEvent(evt)
194            % create sat Rx events for any transmits
195            nTrans = size(txList,1);
196            for index = 1:nTrans
197                % get an new event
198                evt = em.getFreeEvent();
199                evt.eventType = eventRx;
200                evt.dest = 0; % send to satellite
201                txTime = now + txList(index,4);
202                evt.parm = txTime;
203                evt.time = mm(termID).satRxTime(txTime);
204                evt.source = termID;
205                evt.bmc = txList(index,1);
206                evt.epochLoc = txList(index,2);
207                evt.frameLoc = txList(index,3);
208                em.addEvent(evt);
209            end
210        case eventLtFrame
211            ltCount(termID) = ltCount(termID) + 1;
212            % find error between local clock and absolute time.
213            % Master node has an external time reference, and can
214            % actually find this value, other terminals cannot.
215            % Master will use it to drive time error to zero
```

```
216         % other terminals will track Master
217         % record time error for all to display performance
218         currentTimeError = evt.time - ...
219             term(termID).rxFrameID * 0.02;
220         currentTimeError = (currentTimeError - 0.25)*1e9;
221         lteHist(lteCount(termID),termID) = currentTimeError;
222         if termID == 1 % master node
223             term(termID).shiftZeroTime(-currentTimeError);
224         end
225         switch ltState
226             case 0
227                 % neither frame has arrived yet
228                 ltTimeStamp = evt.time;
229                 ltState = termID;
230             case 1
231                 % master lt frame has arrived
232                 assert( termID == 2)
233                 ltCount = ltCount + 1;
234                 ltTime(ltCount) = evt.time;
235                 ltHist(ltCount) = evt.time - ltTimeStamp;
236                 ltState = 0;
237             case 2
238                 % client lt frame has arrived
239                 assert( termID == 1)
240                 ltCount = ltCount + 1;
241                 ltTime(ltCount) = evt.time;
242                 ltHist(ltCount) = ltTimeStamp - evt.time;
243                 ltState = 0;
244         end
245         [evt,ltErr] = term(termID).handleLtFrame(evt);
246
247         em.addEvent(evt)
248
```

```
249            case eventChangeMode
250                term(termID).setMode(evt.parm);
251                em.freeEvent(evt)
252            otherwise
253                fprint('Error - Term %d received unexpected event %d\n', ...
254                    termID, evt.eventType)
255                em.freeEvent(evt)
256        end
257    end % event destination switch
258 end % end Event Loop
259
260 % figure
261 % plot( satTime(1: satCount(1)),   satHist(1: satCount(1),1)*1e9, ...
262 %     termTime(1:termCount(1),1), termHist(1:termCount(1),1)*1e9, ...
263 %     termTime(1:termCount(2),2), termHist(1:termCount(2),2)*1e9)
264 % ylabel('Time Error (ns)')
265 % xlabel('Time (Seconds)')
266 % legend('Sat Rx','Master Rx','Client Rx')
267 % grid on
268
269 figure
270 plot(delayTime(1: satCount(1),1), (delayHist(1: satCount(1),1)-0.12)*1e9, ...
271     delayTime(1: satCount(2),2), (delayHist(1: satCount(2),2)-0.12)*1e9)
272 xlabel('Elapsed Time (Seconds)')
273 ylabel('Delta Prop Delay (ns)')
274 legend('Master', 'Client')
275 title('Propagation Delay at Satellite')
276 grid on
277
278 figure
279 plot(ltTime(1:ltCount), ltHist(1:ltCount)*1e9)
280 ylim([-100 100])
```

```
281    xlabel('Time (Seconds)')
282    ylabel('Difference (ns)')
283    title('Tref - (tx - rx)')
284    grid on
285
286    figure
287    plot(ltTime,lteHist)
288    ylabel('Time Error (ns)')
289    xlabel('Elapsed Time (Seconds)')
290    title('Hubless Time Reference Accuracy')
291    grid on
292    legend('Master', 'Client')
293    % make vertical range more reasonable
294    x = min(min(lteHist))-10;
295    x = floor(x/10);
296    ylim([10*x 10*x+40])
297
298    end
299
300
``` eventClass.m

```
 1    %EVENTCLASS Provides a container class for events
 2    %   Detailed explanation goes here
 3
 4    classdef eventClass < handle
 5        properties
 6            inUse
 7            index
 8            time      % time of event
 9            dest      % who receives the event
10            source    % originator of event
11            eventType
```

```
12        parm
13        refTime   % local time of Tx, relative to tx clock
14        epochLoc  % location of frame in epoch (0:31)
15        frameLoc  % location of hop in frame
16        Bmc
17        nHops
18      end
19
20      methods
21        function evt = eventClass()
22          evt.inUse = false;
23          evt.index = 0;
24          evt.clear();
25        end
26        function clear(evt)
27          if numel(evt) ~= 1
28            s = size(evt);
29            for i = 1:s(1)
30              for j = 1:s(2)
31                evt(i,j).clear();
32              end
33            end
34          else
35            evt.time = 0;
36            evt.dest = 0;
37            evt.source = 0;
38            evt.eventType = 0;
39            evt.parm = [];
40            evt.refTime = 0;
41            evt.epochLoc = 0;
42            evt.frameLoc = 0;
43            evt.bmc = 0;
44            evt.nHops = 0;
```

```
45        end
46    end
47    function clone(to,from)
48        if numel(to) ~= 1
49            s_to = size(to);
50            s_from = size(from);
51            if numel(from) == 1
52                for i = 1:s_to(1)
53                    for j = 1:s_to(2)
54                        to(i,j).clone(from);
55                    end
56                end
57            elseif prod(s_to == s_from)
58                % arrays of same dimension
59                for i = 1:s_to(1)
60                    for j = 1:s_to(2)
61                        to(i,j).clone(from(i,j));
62                    end
63                end
64            else
65                error('clone source must be same size or singleton')
66            end
67        else
68            to.time     = from.time;
69            to.dest     = from.dest;
70            to.source   = from.source;
71            to.eventType = from.eventType;
72            to.parm     = from.parm;
73            to.refTime  = from.refTime;
74            to.epochLoc = from.epochLoc;
75            to.frameLoc = from.frameLoc;
76            to.bmc      = from.bmc;
77            to.nHops    = from.nHops;
```

78        end
79      end
80    end
81 end disp.m 1  function disp( em )
2  %DISP overload of display function
3  %   Detailed explanation goes here
4     if numel(em.eventList) == 0
5        fprintf('Empty Event Queue\n')
6     else
7        for index = em.eventList
8           evt = em.eventArray(index);
9           if evt.inUse
10              fprintf('%11.8f, %d\n', evt.time, evt.eventType)
11          else
12              fprintf('Event Queue Corrupt\n')
13          end
14       end
15    end
16 end eventMgr.m 1  %EVENTMGR Provides an event manager class.
2  %   Detailed explanation goes here
3  classdef eventMgr < handle
4
5     properties(Access = private)
6        nEvents
7        eventArray
8        eventList
9        freeList

```
10    end
11
12    properties
13       currentTime
14    end
15
16    methods
17       disp(em)
18       function em = eventMgr()
19          em.nEvents = 200;
20          ea(em.nEvents) = eventClass;
21          em.eventArray = ea;
22
23          for i=1:em.nEvents
24             evt = em.eventArray(i);
25             evt.clear();
26             evt.inUse = false;
27             evt.index = i;
28          end
29          em.eventList = [];
30          em.freeList = 1:em.nEvents;
31       end
32
33       % returns next event on list, event is removed from lists until
34       % freed or added
35       function evt = nextEvent(em)
36          if numel(em.eventList) == 0
37             error('Event Queue is Empty')
38          elseif numel(em.eventList) == 1
39             index = em.eventList;
40             evt = em.eventArray(index);
41             em.eventList = [];
42             em.currentTime = evt.time;
```

```
43        if evt.index ~= index
44            error('event index mismatch')
45        end
46    else
47        index = em.eventList(end);
48        em.eventList = em.eventList(1:end-1);
49        evt = em.eventArray(index);
50        em.currentTime = evt.time;
51        if evt.index ~= index
52            error('event index mismatch')
53        end
54    end
55    if ~evt.inUse
56        error('nextEvent not in use, Event Manager Corrupt')
57    end
58 end
59
60 function freeEvent(em,evt)
61    evt.inUse = false;
62    em.freeList = [em.freeList evt.index];
63 end
64
65 function evt = getFreeEvent(em)
66    if numel(em.freeList) == 0
67        error('Free List empty')
68    elseif numel(em.freeList) == 1
69        index = em.freeList;
70        evt = em.eventArray(index);
71    else
72        index = em.freeList(end);
73        em.freeList = em.freeList(1:end-1);
74        evt = em.eventArray(index);
75    end
```

```
 76          evt.inUse = true;
 77          evt.clear();
 78       end
 79
 80       function addEvent(em,evt)
 81          if evt.time < em.currentTime
 82             error('Attempt to insert event past current time')
 83          else
 84             % find out where to split
 85             index = evt.index;
 86             split = sum(evt.time < [em.eventArray(em.eventList).time]);
 87             if split == 0
 88                % goes in front
 89                em.eventList = [index em.eventList];
 90             elseif split == numel(em.eventList)
 91                % goes in back
 92                em.eventList = [em.eventList index];
 93             else
 94                % goes in between
 95                em.eventList = ...
 96                   [em.eventList(1:split) index em.eventList(split+1:end)];
 97             end
 98          end
 99       end
100    end
101 end
``` disp.m (for motionclass)

```
 1 function disp( obj )
 2 %DISP Overload of display function
 3 %   Detailed explanation goes here
 4    if numel(obj) == 1
 5       if obj.initialized
```

```
 6      fprintf('Platform %d\n',obj.platform)
 7    else
 8      fprintf('Unitialized Motion Model\n')
 9    end
10  else
11    fprintf(' motionClass Array (%d x %d)\n',size(obj));
12  end
13 end
``` genSamples.m

```
 1  function genSamples( mm )
 2  %GENSAMPLES This method generates the next 100 samples of platform motion
 3  %   Detailed explanation goes here
 4
 5      % shift everything forward 100 samples
 6      mm.delays(1:100) = mm.delays(101:200);
 7      mm.rates(1:100)  = mm.rates(101:200);
 8
 9      newRates = zeros(1,100);
10
11      %generate 100 samples of new rates based upon motion model
12      switch(mm.platform)
13          case 0
14              % No motion, do nothing
15          case 1
16              % constant motion
17              newRates = ones(1,100) * mm.rate;
18          case 2
19              % sinusoid
20              phase = mm.phase + mm.phaseStep * (0:99);
21              newRates = mm.rate * sin(phase);
22              phase = phase(end) + mm.phaseStep;
```

```
23      mm.phase = mod(phase,2 * pi);
24    case 3
25       % shipboard
26       % split frame into smaller pieces to smooth out transitions
27       % occuring mid frame
28       nSubSteps = 2;
29       for ii = 1:100
30          tempRate = 0;
31          for pass = 1:nSubSteps
32             % determine if we are going to force a premature state
33             % change
34             forceChange = (mm.pChange > 2 * rand());
35             step = 0.02 / nSubSteps;
36             % update motion state for 1/50 sec later
37             mm.v  = mm.v           + ...
38                 step   * mm.vd  / 1 + ...
39                 step^2 * mm.vd2 / 2;
40             mm.vd = mm.vd + step * mm.vd2;
41
42             % save delta time over next frame
43             dTime = ...
44                 (step  * (mm.v )   + ...
45                  step^2 * (mm.vd ) / 2 + ...
46                  step^3 * (mm.vd2) / 3 );
47             tempRate = tempRate + dTime;
48             % update second derivative (jerk) based upon state
49             switch mm.state
50                case 0  % max positive jerk
51                   if forceChange || mm.vd >= mm.Vd1Max ...
52                         || mm.v  >= mm.vTrans
53                      mm.vd2 = 0;
54                      mm.state = 1;
55                   end
```

```
56          case 1 % constant positive acceleration
57              if forceChange || mm.v  >= mm.vTrans ...
58                  || mm.vd <= -mm.Vd1Max
59              mm.vd2 = - mm.Vd2Max; % hit brakes
60              mm.state = 2;
61              end
62          case 2 % max negative jerk
63              if forceChange || mm.vd <= -mm.Vd1Max ...
64                  || mm.v  <= -mm.vTrans
65              mm.vd2 = 0;
66              mm.state = 3;
67              end
68          case 3 % constant negative acceleration
69              if forceChange || mm.v <= -mm.vTrans ...
70                  || mm.vd >= mm.Vd1Max
71              mm.vd2 = mm.Vd2Max; % hit gas
72              mm.state = 0;
73              end
74          end % switch
75      end % for
76      newRates(ii) = tempRate + mm.rate;
77      end
78  end
79  mm.rates(101:200) = newRates;
80  % rates are in ns/frame since samples are frames, no need to convert
81  mm.delays(101:200) = -cumsum(newRates) * 1e-9 + mm.delays(100);
82  mm.startTime = mm.startTime + 0.02 * 100;
83  end
``` init.m

```
1  function init( mm, platform, parm )
2  %INIT Initializes Platform Motion Model
3
```

```
4   if numel(mm) > 1
5     s = size(mm);
6     for i = 1:s(1)
7       for j = 1:s(2)
8         mm(i,j).init(platform, parm)
9       end
10    end
11  else
12    mm.initialized = true;
13    mm.platform = platform;
14    mm.parm = parm;
15    mm.rate = 0;
16    mm.staticDelay = 0.12;
17    mm.startTime = 0;
18    mm.rates  = zeros(1,200);
19    mm.delays = ones(1,200) * mm.staticDelay;
20    mm.lastRate =0;
21
22    % any special initialization goes here
23    switch platform
24      case 0
25        % do nothing, always return zero
26      case 1
27        % return a constant ramp
28        mm.rate = parm(1);
29      case 2
30        % sinusoid
31        if numel(parm) < 3
32          error('sinusoid parms are [magnitude, period, phase]')
33        else
34          mm.rate = parm(1);
35          mm.phaseStep = 2 * pi /parm(2);
36          mm.phase = parm(3);
```

```
37          end
38       case 3
39          % shipboard
40          if numel(parm) < 2
41             error('Ship Motion parms are [fixedRate, dynamicRate]')
42          else
43             mm.rate  = parm(1);
44             mm.state = 0;
45             mm.vMax  = parm(2);
46             mm.Vd1Max = MAX_ACCEL;
47             mm.Vd2Max = MAX_JERK;
48             mm.pChange = 0.02; % about 1 Hz random change
49
50             % Find transition velocity
51             transTime = mm.Vd1Max / mm.Vd2Max;
52             mm.vTrans = mm.vMax - mm.Vd2Max * transTime^2 / 2;
53
54             % randomly select the phase for motion model A
55             mm.state = randi(4) - 1;
56             switch mm.state
57                case 0 % max positive jerk
58                   mm.vd2 = mm.Vd2Max;
59                   mm.vd  = mm.Vd1Max * (1 - 2 * rand());
60                   mm.v   = mm.vTrans * (1 - 2 * rand());
61                case 1 % zero Jerk, positive accel & velocity
62                   mm.vd2 = 0;
63                   mm.vd  = mm.Vd1Max * rand();
64                   mm.v   = mm.vTrans * rand();
65                case 2 % max neg Jerk
66                   mm.vd2 = -mm.Vd2Max;
67                   mm.vd  = mm.Vd1Max * (1 - 2 * rand());
68                   mm.v   = mm.vTrans * (1 - 2 * rand());
69                case 3 % zero Jerk, negative accel & velocity
```

```
70              mm.vd2 = 0;
71              mm.vd  = -mm.Vd1Max * rand();
72              mm.v   = -mm.vTrans * rand();
73          end
74        end
75      otherwise
76        mm.initialized = false;
77    end
78
79    if mm.initialized
80       mm.genSamples();
81       mm.genSamples();
82       mm.startTime = 0;
83    end
84  end
85 end
``` motionclass.m

```
1  % This is a class description for a platform motion model
2  classdef motionClass < handle
3    properties
4      initialized
5      platform
6      parm
7      staticDelay
8      rate
9      lastRate
10     phase
11     phaseStep
12     state
13     pChange
14     vMax
15     Vd1Max
```

```
16        Vd2Max
17        vTrans
18        v
19        vd
20        vd2
21        startTime
22        rates
23        delays
24     end
25
26     methods
27        function obj = motionClass()
28           obj.initialized = false;
29           obj.platform = 0;
30        end
31
32        function disp( obj ) % Overload of display function
33           if numel(obj) == 1
34              if obj.initialized
35                 fprintf('Platform %d\n',obj.platform)
36              else
37                 fprintf('Unitialized Motion Model\n')
38              end
39           else
40              fprintf(' motionClass Array (%d x %d)\n',size(obj));
41           end
42        end
43
44        init(obj, platform, parm)
45
46        rxDelay = satRxDelay(obj,txTime)
47
48        rxDelay = termRxDelay(obj,txTime)
```

```
49
50      function rxTime = satRxTime(mm,txTime)
51          rxTime = txTime + mm.satRxDelay(txTime);
52      end
53
54      function rxTime = termRxTime(mm,txTime)
55          rxTime = txTime + mm.termRxDelay(txTime);
56      end
57
58      function fShift = freqShiftHz(mm,ctrFreqGHz)
59          % adjust for frame rate
60          fShift = ctrFreqGHz * [mm.lastRate] * 50;
61      end
62
63      function name = platformName(obj)
64          if obj.initialized
65              switch obj.platform
66                  case 0
67                      name = 'Static';
68                  case 1
69                      name = 'Ramp';
70                  case 2
71                      name = 'Sinusoid';
72                  case 3
73                      name = 'Shipboard';
74                  otherwise
75                      name = 'Undefined';
76              end
77          else
78              name = 'Unitialized';
79          end
80      end
81  end
```

```
82
83    methods (Access = private)
84        genSamples(obj)
85    end
86 end
``` satRxDelay.m

```
1  function rxDelay = satRxDelay( mm, txTime)
2  %SATRXTIME provides the propagation time to the satellite for the current
3  %transmit time
4  %   Motion is relative to the satellite. Time is also relative to the
5  %   satellite
6
7  % see if we are dealing with an array
8  if numel(mm) > 1
9      s = size(mm);
10     rxDelay = zeros(s);
11     if numel(txTime) == 1
12         t = ones(s) * txTime;
13     elseif prod(size(txTime) == s)
14         t = txTime;
15     else
16         error('txTime Array size must be 1 or match motionClass array size')
17     end
18     for i = 1:s(1)
19         for j = 1:s(2)
20             rxDelay(i,j) = mm(i,j).satRxDelay(t(i,j));
21         end
22     end
23 else
24     % make sure we are initialized
```

```
25    if mm.initialized
26      if txTime > mm.startTime
27        while txTime > (mm.startTime + 3.0)
28          mm.genSamples
29        end
30        t = txTime - mm.startTime;
31        i = floor(50*t);
32        t1 = mm.delays(i+1);
33        t2 = mm.delays(i+2);
34        r1 = mm.rates(i+1);
35        r2 = mm.rates(i+2);
36        p = 50*(t - i * 0.02); % fraction of spacing
37        rxDelay = t1 + p * (t2-t1);
38        mm.lastRate = r1 + p * (r2-r1);
39      else
40        error('Time specified is out of range (Early)')
41      end
42    else
43      error('Motion Model not initialized')
44    end
45  end
46 end
``` termRxDelay.m

```
1  function rxDelay = termRxDelay( mm, txTime )
2  %TERMRXDELAY provides the propogation time from the satellite to the
3  %terminal. Motion & time is relative to the satellite
4  %   Detailed explanation goes here
5
6  % see if we are dealing with an array
7  if numel(mm) > 1
8    s = size(mm);
9    rxDelay = zeros(s);
```

```
10    if numel(txTime) == 1
11       t = ones(s) * txTime;
12    elseif prod(size(txTime) == s)
13       t = txTime;
14    else
15       error('txTime Array size must be 1 or match motionClass array size')
16    end
17    for i = 1:s(1)
18       for j = 1:s(2)
19          rxDelay(i,j) = mm(i,j).termRxDelay(t(i,j));
20       end
21    end
22 else% make sure we are initialized
23    if mm.initialized
24       if txTime > mm.startTime
25          while txTime > (mm.startTime + 3.0)
26             mm.genSamples
27          end
28          t = txTime - mm.startTime;
29          i = floor(50*t);
30          t1 = mm.delays(i+1);
31          t2 = mm.delays(i+2);
32          r1 = mm.rates(i+1);
33          r2 = mm.rates(i+2);
34          p = 50*(t - i * 0.02); % fraction of spacing
35          % find intersection
36          k = 0;
37          t3 = 0.02*(1-p+k);
38          while t2 > t3
39             k = k + 1;
40             t1 = t2;
41             t2 = mm.delays(i + 2 + k);
```

```
42          t3 = 0.02*(1-p+k);
43        end
44        rxDelay = t1 + (t3-0.02-t1)*(t2-t1)/(t3-0.02+t2-t3-t1);
45        mm.lastRate = r1 + (t3-0.02-t1)*(r2-r1)/(t3-0.02+t2-t3-t1);
46      else
47        error('Time specified is out of range (Early)')
48      end
49    else
50      error('Motion Model not initialized')
51    end
52  end
53  end
``` handleRxEvent.m

```
1   function [usable,timeErr] = handleRxEvent(term,evt)
2   %HANDLERXEVENT Processes Rx Event
3   %   Processing depends upon mode
4   if evt.epochLoc == term.rxFrameID
5     if term.mode > 1 % not in Rx acquisition mode
6       if evt.source == 1 % from master send to Rx Tracker
7         usable = true;
8         rxTime = evt.time - term.rxFrameStart; % remove start of current Rx frame
9         % adjust for current Rx time rate here. Which ever is later will have a
10        % larger time. If the Rx event is advanced, then the time error is
11        % positive
12        timeErr = evt.frameLoc * HOP_PERIOD - rxTime;
13        timeErr = timeErr - (evt.frameLoc * term.rxRate/HOPS_PER_FRAME) * 1e-9;
14        measAcc = 10;
15        timeMeas = timeErr * 1e9 + measAcc * randn;
16
```

```
17          % pass measurements to Rx tracker
18          calllib('trackLib','select_tLoop',term.id);
19
   calllib('trackLib','tLoop_addTimeErrorMeasurement',timeMeas,measAcc)
   ;
20          if term.mode == 2 % in Rx Pull-in
21            if term.state(1) < 1
22              term.mode = 3; % to Tx Acquisition
23              % initialize Tx Tracker
24              calllib('trackLib','txTrack_select',term.id);
25              % initialize time acc, drift acc, and drift rate
26              calllib('trackLib','txTrack_init',2000,20,0);
27
28            else
29              term.state(1) = term.state(1) - 1;
30            end
31          end
32         elseif evt.source == term.id % it is ours, Must be client, use for Tx
   Tracking
33          calllib('trackLib','txTrack_select',term.id);
34          usable = true;
35          % figure out which kind of probe we are going to use
36          trkAcc = calllib('trackLib','txTrack_getAccuracy');
37          if trkAcc < 90
38             efProbe = 1;
39          else
40             efProbe = 0;
41          end
42          rxTime = evt.time - term.rxFrameStart; % remove start of current
   Rx frame
43          % adjust for current Rx time rate here. Which ever is later will
   have a
44          % larger time. If the Rx event is advanced, then the time error is
```

```
45          % positive
46          timeErr = evt.frameLoc * HOP_PERIOD - rxTime;
47          timeErr = timeErr - (evt.frameLoc *
    term.rxRate/HOPS_PER_FRAME) * 1e-9;
48          measAcc = calllib('trackLib','txTrack_calcMeasAccuracy', ...
49              efProbe, 32, 17);
50          timeMeas = timeErr * 1e9 + measAcc * randn;
51          results = [0,0]; % allocate storage
52          isLate = timeErr < 0;
53          efProbe = 0;
54          errMag = abs(timeMeas);
55          detected = true;
56          % error passed is proportionate to symbol period of probe
57          if efProbe
58              errMag = errMag * FINE_PROBE_GAIN;
59          else
60              errMag = errMag * EFINE_PROBE_GAIN;
61          end
62          errMag = floor(errMag * 8192);
63          errMag = min([errMag 8190]);
64          results = calllib('trackLib','txTrack_update', results, ...
65              detected, isLate, efProbe, errMag, 2 * measAcc);
66          % rate is treated as ns/sec, convert to ns/frame
67          results(2) = results(2) * 0.02;
68          term.txTrk = results;
69        Else
70          timeErr = 0;
71          usable = false;
72        end
73      elseif term.mode == 1 % initial Rx Acquisition
74        usable = true;
75        rxTime = evt.time - term.rxFrameStart; % remove start of current Rx
    frame
```

| | |
|---|---|
| 76 | % adjust for current Rx time rate here. Which ever is later will have a |
| 77 | % larger time. If the Rx event is advanced, then the time error is |
| 78 | % positive |
| 79 | timeErr = evt.frameLoc * HOP_PERIOD - rxTime; |
| 80 | timeErr = timeErr - (evt.frameLoc * term.rxRate/HOPS_PER_FRAME) * 1e-9; |
| 81 | measAcc = 2000; |
| 82 | timeMeas = timeErr * 1e9 + measAcc * randn; |
| 83 | % make a gross adjustment in Rx frame timing |
| 84 | term.updates(2,1) = timeMeas; |
| 85 | term.mode = 2; % goto Rx Pull-in |
| 86 | term.state(1) = 10; % track 10 syncs before transitioning to Tx Tracking |
| 87 | else % ignore |
| 88 | usable = false; |
| 89 | timeErr = 0; |
| 90 | end |
| 91 | else |
| 92 | timeErr = 0; |
| 93 | usable = false; |
| 94 | end | handleRxFrame.m

| | |
|---|---|
| 1 | function evt = handleRxFrame(term,evt) |
| 2 | %HANDLETXFRAME perform Rx Processing |
| 3 | %   Detailed explanation goes here |
| 4 | term.rxFrameStart = evt.time; |
| 5 | term.rxFrameID = term.rxFrameID + 1; |
| 6 | |
| 7 | % process time measurements made during previous frame |
| 8 | calllib('trackLib','select_tLoop',term.id); |
| 9 | calllib('trackLib','tLoop_loadHwMeasurements'); |

```
10   rxUpdate = zeros(1,3);
11   txUpdate = zeros(1,3);
12   frameID = [term.rxFrameID + 1, 0];
13   accuracy = zeros(1,2);
14   [rxUpdate, txUpdate, accuracy,frameID] = ...
15      calllib('trackLib','tLoop_processLoop2',...
16      rxUpdate, txUpdate, accuracy, frameID);
17
18   txIndex = mod(frameID(2),16) + 1;
19   rxIndex = mod(frameID(1),16) + 1;
20
21   % ignore until frameID is positive
22   if term.rxFrameID > -1
23      term.txFrames(txIndex) = frameID(2);
24      term.txRates(txIndex) = txUpdate(2);
25      term.updates = [term.updates(2,:); rxUpdate];
26      term.rxRate = term.updates(1,2);
27      % adding time to clock makes event happen sooner
28      frameTime = 0.02 - sum(term.updates(1,1:2)) * 1e-9;
29      timeAdj = term.timeAdjList(rxIndex);
30      term.timeAdjList(rxIndex) = 0;
31   else
32      term.txFrames(txIndex) = 0;
33      term.txRates(txIndex) = 0;
34      frameTime = 0.02;
35      timeAdj = 0;
36   end
37
38   % setup next receive frame, inbound event is RxFrameEvent
39   evt.time = evt.time + frameTime + timeAdj * 1e-9;
40   end
``` handleTxFrame.m

```
1   function [evt, txList] = handleTxFrame(term,evt)
2   %HANDLETXFRAME perform Tx Processing
3   %   Frame strobe occurs at the start of the current frame
4   %   This method posts the next frame strobe, and provides the
5   %   transmits that will occur on this frame
6
7   % setup next transmit frame, inbound event is TxFrameEvent
8   % check if there is a timing update for this frame
9   txIndex = mod(term.txFrameID,16) + 1;
10  if term.txFrames(txIndex) == term.txFrameID
11      term.txRate = term.txRates(txIndex);
12  end
13
14  txRate = term.txRate + term.txTrk(2);
15
16  term.txFrameStart = evt.time;
17
18  evt.time = evt.time + 0.02 - (txRate + term.txTrk(1)) * 1e-9;
19  term.txTrk(1) = 0;
20
21  switch term.mode
22      case 0 % Client Idle
23          txList = [];
24      case 1 % Client Rx Acquire
25          txList = [];
26      case 2 % Client Rx Pull-in
27          txList = [];
28      case 3 % Client Tx Pull-in
29          % send sync burst every 64 frames
30          if mod(term.txFrameID,64) == term.id
31              hop = 300 + term.id;
32              txTime = hop * HOP_PERIOD - (txRate * hop/HOPS_PER_FRAME)*1e-9;
```

```
33            % BMC, frame ID, hop, delay from start of frame
34            txList = [168 term.txFrameID hop txTime];
35        else
36            txList = [];
37        end
38    case 10 % Master Node
39  %       if term.timeAdjRemain > 20
40  %           timeAdj = 1;
41  %       elseif term.timeAdjRemain < -20
42  %           timeAdj = -1;
43  %       else
44  %           timeAdj = term.timeAdjRemain / 100;
45  %       end
46        timeAdj = term.timeAdjRemain/1000;
47        if timeAdj > 0.0025
48            timeAdj = 0.0025;
49        elseif timeAdj < -0.0025
50            timeAdj = -0.0025;
51        end
52        evt.time = evt.time + timeAdj * 1e-9;
53        term.timeAdjList(txIndex) = timeAdj;
54        % send syncs every 4 frames
55        if mod(term.txFrameID,4) == term.id
56            hop = 300 + term.id;
57            txTime = hop * HOP_PERIOD - (txRate * hop/HOPS_PER_FRAME)*1e-9;
58            % BMC, frame ID, hop, delay from start of frame
59            txList = [168 term.txFrameID hop txTime];
60        else
61            txList = [];
62        end
63  end
64
```

```
65   term.txFrameID = term.txFrameID + 1;
66
67 end
``` terminalClass.m

```
 1  %TERMINALCLASS contains the state variables for a terminal
 2
 3  classdef terminalClass < handle
 4
 5     properties
 6        id
 7        mode
 8        state
 9        txFrameID
10        txFrameStart    % starting time for current Tx frame
11        txRate          % rate of time applied to current Tx frame
12        rxFrameID
13        rxFrameStart    % starting time for current Rx frame
14        rxRate          % rate of time applied to current Rx frame
15        timeAdjRemain   % amount of time adjustment remaining to be made
16        timeAdjInTrans  % time adjustment currently in flight
17        timeAdjList     % list of frame time adjustments in flight
18        ltFrameID       % local time frame ID
19        ltFrameStart    % starting time for time-keeping frame
20        ltRate          % rate of time being applied to current time-keeping
21                        % frame
22        ltTrk           % state variable for LT
23        lastLtErr       % last local time error measurement
24        rxEpIndex       % index of Rx frame within epoch (1..32)
25        txEpIndex       % index of Tx frame within epoch (1..32)
26        txTrk           % commands from Tx Tracker
27        updates
```

```
28        txRates
29        txFrames
30      end
31
32      methods
33        function term = terminalClass()
34          term.init();
35        end
36
37        function init(term)
38          term.id = [];
39          term.mode        = 0;
40          term.state       = zeros(1,5);
41          term.rxFrameStart = 0;
42          term.txFrameStart = 0;
43          term.ltFrameStart = 0;
44          term.txFrameID   = 0;
45          term.rxFrameID   = 0;
46          term.ltFrameID   = 0;
47          term.rxRate      = 0;
48          term.txRate      = 0;
49          term.ltRate      = 20; % initial rate error
50          term.ltTrk       = 0;
51          term.lastLtErr   = 0;
52          term.timeAdjRemain = 0; % amount of time adjustment remaining to be made
53          term.timeAdjList  = zeros(16,1);
54          term.rxEpIndex   = 0;
55          term.txEpIndex   = 0;
56          term.txTrk       = [0 0];
57          term.updates = zeros(2,3);
58          term.txRates = zeros(16,1);
59          term.txFrames = zeros(16,1);
```

```
60      end
61
62      % used to adjust adjust time inorder to align with external time
63      % reference. adjusts Tx & Rx frame timing in equal ammounts.
64      % only used on master node
65      function shiftZeroTime(term,timeShift)
66          if term.mode == 10
67              term.timeAdjRemain = timeShift;
68          end
69      end
70
71      function setMode(term,mode)
72          term.mode = mode;
73      end
74
75      % perform local time keeping
76      function [evt,timeErr] = handleLtFrame(term,evt)
77          now = evt.time;
78          term.ltFrameStart = now;
79          % set up next frame event
80          evt.time = now + 0.02 - term.ltRate * 1e-9;
81          term.ltFrameID = term.ltFrameID + 1;
82
83          % find the time deltas to the Rx & Tx Clocks
84          rxDelta = 0.02 * (term.rxFrameID - term.ltFrameID) + ...
85              (now - term.rxFrameStart) * ...
86              (0.02 + term.rxRate * 1e-9) / 0.02;
87          txDelta = 0.02 * (term.txFrameID - term.ltFrameID) + ...
88              (now - term.txFrameStart) * ...
89              (0.02 + term.txRate * 1e-9) / 0.02;
90
91          % how the terminal react depends on the size of the error
92          timeErr = (rxDelta + txDelta)/2;
```

```
93
94      if timeErr > 0.02
95          term.ltFrameID = term.ltFrameID + floor(timeErr/0.02);
96          term.lastLtErr = 0;
97          term.ltTrk = 0;
98      elseif timeErr < - 0.02
99          term.ltFrameID = term.ltFrameID - floor(-timeErr/0.02);
100         term.lastLtErr = 0;
101         term.ltTrk = 0;
102     elseif abs(timeErr) > 0.001
103         % normal tracking is never this far off
104         % make gross adjustment in time, do not touch time rate
105         evt.time = evt.time - timeErr;
106         term.lastLtErr = 0;
107         term.ltTrk = 0;
108     Else
109         % time error is within a millisecond, assume terminal is
110         % tracking both tx & rx, adjust rates
111         timeErr = timeErr * 1e9; % convert units to ns
112         term.ltTrk = term.ltTrk + 0 * timeErr;
113         term.ltRate = 0.0003 * timeErr + 0.00000001 * term.ltTrk;
114
115  %      Dead Code Removed
116  %
117  %
118  %
119  %
120  %
121  %
122  %
123  %
124  %
125  %
```

```
126         end
127       end
128       % perform tx frame processing
129       % post next Tx Frame event, list transmits for this frame
130       [evt, txList] = handleTxFrame(term,evt)
131
132       % perform rx frame processing, process time measurements
133       evt = handleRxFrame(term,evt)
134
135       % process Rx Event
136       [usable,timeErr] = handleRxEvent(term,evt)
137
138     end
139 end
``` addTerminalLib.m

```
1  function [ output_args ] = addTerminalLib( )
2  %ADDTERMINALLIB Adds terminalLib to search path.
3  %   terminalLib contains common terminal bit-true model components
4
5  try
6      result = terminalLibCanary();
7  catch
8      % terminalLib has not been added. Try adding it now
9      currentPwd = pwd; % need to return here
10     % edit following line if this command fails
11     cd ../.. % go back to directory holding terminalLib
12     addpath([pwd '/terminalLib']);
13
14     cd(currentPwd);
15
16     try
17         result = terminalLibCanary();
```

```
18    catch
19        error('Could not add terminalLib to path. Edit addTerminalLib to correct')
20    end
21 end
```

TrackingLoop.cpp

```
1  // The TrackingLoop class contains the Kalman Filter portion of the
2  // time tracker
3
4  // Initialiation, Derivation, and calculation of the different matricies
5  // such as the phi matrix is dependant upon the characteristics of the platform
6  // motion and is not shown here. Methods for generating these can be found in
7  // text books and literature describing the application of Kalman Filters.
8  // Names of variables align with names for Kalman Filter elements given in the
9  // technical literature.
10
11 // Load the measurements of frequency and time errors reported by the hardware.
12 // HW measurements were made during the previous frame. Update the filter with these
13 // measurements prior to advancing to the next frame and predicting future time error
14 void TrackingLoop::loadHwMeasurements(
15     hwTimeErrEstimate_t *estimates,  // HW measurements from last frame
16     uint32_t         nEstimates) // number of estimates to process (zero is valid)
17 {
18     uint32_t i;
19
20     for (i = nEstimates; i > 0U; i--)
21     {
22         if (estimates->timeEstValid)
23         {
```

```
24        double  R;    // variance of measurement
25        kVector_t K;  // Kalman Gain (column vector)
26
27        // Find the Kalman gain given the current estimate's and the
28        // measurement's covariances. The Equation for this is:
29        // K = P * H' / (H * P * H' + R)
30        // P is the covariance of the current filter state
31        // H maps the state to the estimate.
32        // H1 maps the state to the time estimate.
33        // H2 maps the state to the time rate.
34        // R is the accuracy of the measurement
35        R = estimates->timeEstAccNs;
36        R *= R;
37        K = P * H1.transpose() / (H1 * P * H1.transpose() + R);
38
39        // Update estimate
40        // X = X + K * (z - H * X)
41        X = X + K * (estimates->timeEstNs - H1 * X);
42
43        // Update covariance of filter state
44        // P = (I - K * H) P
45        P = (eye - K * H1) * P;
46     }
47     // Incorporating frequency measurements is a little different
48     // frequency error is the sum of Doppler shift from velocity and
49     // a frequency offset. The frequency offset is tracked as a
50     // velocity measurement offset. This estimate is stored as a separate
51     // element of the filter state vector. H2 gives the time rate,
52     // H3 gives the combination of this and the velocity measurement offset.
53     if (estimates->freqEstValid)
54     {
55        double   R;  // variance of measurement
56        kfVector_t K;  // Kalman Gain (column vector)
```

```
57          double   z;   // measurement
58          z = estimates->freqEstHz;
59          z += pendingUpdates[0].freqHz; // add Rx freq offset in effect
60                                         // when measurement was made
61          z /= k_Doppler;                // convert to time rate
62                                         // add Rx time rate in effect
63                                         // when measurement was made
64          z += pendingUpdates[0].timeRateNsPerFrame;
65
66          R = estimates->freqEstAccHz;
67          R /= k_Doppler;                // convert to time rate
68          R *= R;                        // square sigma to get variance
69
70          K = P * H3.transpose() / (H3 * P * H3.transpose() + R);
71
72          // Update estimate
73          // X = X + K * (z - H * X)
74          X = X + K * (z - H3 * X);
75
76          // Update covariance of filter state
77          // P = (I - K * H) P
78          P = (eye - K * H3) * P;
79      }
80      estimates++;   // point to next estimate
81  }
82 }
83
84 // called on every frame to provide updates for next frame and return results
85 void TrackingLoop::processLoop(
86     timeUpdate_t &rxTimeUpdate, // returns time and time rate outputs applied next rxFrame
87     timeUpdate_t &txTimeUpdate, // returns time and time rate outputs applied future txFrame
```

```
 88      accuracy_t &rxAccuracy)
 89    {
 90      float timeErr0;
 91      // On entry the filter is current with when the last frame's measurements were made
 92      // and will be advanced to the current frame at the end of this method.
 93      // relative to the current filter state which was when the last set of
 94      // measurements were made, here is the time line :
 95      // +0 frames - Measurements made by hardware
 96      // +1 frames - measurements processed by software (including this routine)
 97      // +2 frames - timing updates enacted by hardware
 98
 99      // Advance the state one frame to the current frame and add plant noise
100      // to the covariance
101
102      X = phi * X;              // advance state 1 frame
103
104      P = phi * P * phi.transpose() + Q; // Advance covariance 1 frame & add plant noise
105
106      // remove pending updates that will have been executed prior
107      // to next frames measurements. The time rate from the previous frame is not included,
108      // it will have been handled by the rate component of the KF when it was clocked foward.
109      {
110         float deltaT_Ns;
111
112         deltaT_Ns = pendingUpdates[1].timeAdjNs + pendingUpdates[0].timeRateNsPerFrame;
113
114         // Convert the time to filter state space and subtract. Use first column of
115         // inverse augmented B matrix.
```

```
116
117        X = X - deltaT_Ns * bAugCol1;
118
119        // also remove from last Tx offset
120        lastTxOffset -= deltaT_Ns;
121    }
122
123    // initialize the time accuracy with the current estimated time error
124    timeErr0 = (float)(H1 * X);
125
126    if (timeErr0 < 0)
127    {
128        rxAccuracy.timeAccuracyNs = -timeErr0; // use absolute value
129    }
130    else
131    {
132        rxAccuracy.timeAccuracyNs = timeErr0;
133    }
134
135    // done with pending updates for previous frame. Shift forward 1 frame
136    pendingUpdates[0] = pendingUpdates[1];
137
138    // time to forecast the future. Advance by 1 & 2 frames to find the expected time
139    // error at the beginning and end of the frame after the current one.
140    {
141        kfVector_t X1, X2; // future states
142        float timeErr, timeErr1, timeErr2;
143        float timeRateNsPerFrame;
144
145        X1 = phi * X;  // state at beginning of next frame
146        X2 = phi2 * X; // state at end of next frame
147
```

```
148              // find expected time error at beginning and end of next frame
149              timeErr1 = (float)(H1 * X1);
150              timeErr2 = (float)(H1 * X2);
151
152              // initalize freqAccuracy output with expected rate error
153              rxAccuracy.freqAccuracyHz = timeErr1 - timeErr0;
154              rxAccuracy.freqAccuracyHz -= pendingUpdates[0].timeRateNsPerFrame;
155
156              if (rxAccuracy.freqAccuracyHz < 0)
157              {
158                  rxAccuracy.freqAccuracyHz *= -1;
159              }
160
161              timeRateNsPerFrame = timeErr2 - timeErr1;
162
163              // time rate goes through as is unless hubless, in which case it is
164              // adjusted by the rate used on this transmit frame
165
166              rxTimeUpdate.timeRateNsPerFrame = timeRateNsPerFrame;
167              pendingUpdates[1].timeRateNsPerFrame = timeRateNsPerFrame;
168
169              if (hublessMaster)
170              {
171                  // Tracking own syncs. Transmit time adjustments that were made
172                  // N frames ago, will now impact Rx timing. The rate of time for this tx frame
173                  // is in the opposite direction and is added to take it away from the time
174                  // rate update being sent to hardware
175                  uint32_t frameID = rxTimeUpdate.frameID;
176                  if (updateHistory[frameID & 0x0000000F].frameID == frameID)
177                  {
178                      // Some Tx adjustments have been made for this frame
```

```
179             rxTimeUpdate.timeRateNsPerFrame += updateHistory[frameID & 0x0000000F].timeRateNsPerFrame;
180             rxTimeUpdate.timeAdjNs += updateHistory[frameID & 0x0000000F].timeAdjNs;
181         }
182     }
183
184     // remove time updates that will happen on next frame
185     // timeAdjustment for the coming frame has already been removed
186     // when advancing the filter. That leaves the time rate
187     // for the next frame
188     timeErrNs = timeErr1Ns - pendingUpdates[0].timeRateNsPerFrame;
189
190     // place hard limits on time error adjustments
191     if (timeErrNs > maxTimeAdjustmentNs)
192     {
193         timeErrNs = maxTimeAdjustmentNs;
194     }
195     else if (timeErrNs < -maxTimeAdjustmentNs)
196     {
197         timeErrNs = -maxTimeAdjustmentNs;
198     }
199
200     pendingUpdates[1].timeAdjNs = timeErrNs;
201     rxTimeUpdate.timeAdjNs = timeErrNs;
202
203     freqOffEstHz = H4 * X * k_Doppler;
204
205     rxTimeUpdate.freqHz = (float)freqOffEstHz;
206     pendingUpdates[1].freqHz = (float)(freqOffEstHz);
207 }
208 // forcast motion into the future, when current transmits
209 // will be received
```

```
210    txTimeUpdate.frameID = rxTimeUpdate.frameID + propDelay;
211    {
212        kfVector_t futureX; // future State
213        float t1, t2;
214
215        // The phi matrix transforms the filter state to a predicted
216        // value for the state a known time period into the future.
217        // The time period for phiLR is the total propagation delay
218        // to the satellite and back. If the propagation delay is
219        // relatively constant (e.g. Geosynchronous Satellite) phiLR may
220        // be calculated once, If the propagation delay is changing
221        // then phiLR may be calculated more frequently.
222        futureX = phiLR * X;
223
224        t1 = static_cast<float> (H1 * futureX);
225        t2 = static_cast<float> (H1 * phi * futureX);
226        // lastTxOffset is the time offset (t2) predicted last frame
227        // now that the future is closer, the old t2, should be the new t1
228        // any difference is a time step that should be added here
229
230        txTimeUpdate.freqHz = 0;
231        txTimeUpdate.timeAdjNs = lastTxOffset - t1;
232        txTimeUpdate.timeRateNsPerFrame = (t1 - t2);
233        lastTxOffset = t2;
234
235        // in Hubless mode the Rx tracker is tracking the total propagation
236        // delay. Allocate half of that to the Tx Path
237        if (hublessMaster)
238        {
239            txTimeUpdate.timeRateNsPerFrame *= 0.5f;
240            txTimeUpdate.timeAdjNs *= 0.5f;
241        }
242        // save update history and update indicies
```

```
243        updateHistory[txTimeUpdate.frameID & 0x0000000F] = txTimeUpdate;
244      }
245
246      // calculate the uncertainty. Time accuracy already has the expected time
247      // error for this frame
248      {
249        // start with the time accuracy
250        float timeAccNs;
251        timeAccNs = (float)(H1 * P * H1.transpose());
252        timeAccNs = sqrt(timeAccNs);
253
254        // add 3 sigma of expected time error to residual/uncorrected time error
255        rxAccuracy.timeAccuracyNs += 3.0F * timeAccNs;
256      }
257
258      // now for the freq (timeRate) accuracy
259      {
260        double freqAccHz;
261
262        freqAccHz = H3 * P * H3.transpose(); // Doppler velocity variance
263        freqAccHz = sqrt(freqAccHz);         // Doppler velocity sigma
264
265        rxAccuracy.freqAccuracyHz += 3.0F * (float)freqAccHz;
266        rxAccuracy.freqAccuracyHz *= (float)k_Doppler;   // Doppler sigma
267        // compute frequency offset accuracy for debugging purposes
268        freqOffAccHz2 = H4 * P * H4.transpose() * k_Doppler * k_Doppler;
269      }
270 }
271
272 void TrackingLoop::updateMeasurementSpace()
273 {
274   measurementSpace[0] = H1 * X;   // [0] Time error estimate
275   measurementSpace[1] = H2 * X;   // [1] Time rate estimate
```

276    measurementSpace[2] = H3 * X;   // [2] Time rate offset estimate
277    measurementSpace[3] = H4 * X;   // [3] Aggregate time rate estimate
278  } trackLib.cpp

```
1   #include "trackLib.h"
2   #include <stdint.h>
3   #include "TrackingLoop.h"
4   #include "txTrack.h"
5   TxTrack localTxTrack[10];
6   TxTrack * txTrackPtr = &localTxTrack[0];
7
8   EXPORTED_FUNCTION void   txTrack_select(int32_t index)
9   {
10     if (index < 10)
11     {
12        txTrackPtr = &localTxTrack[index];
13     }
14     else
15     {
16        txTrackPtr = &localTxTrack[0];
17     }
18  }
19
20  EXPORTED_FUNCTION void   txTrack_init(float timeAcc, float driftAcc, float drift)
21  {
22     txTrackPtr->init(timeAcc, driftAcc, drift);
23  }
24
25  EXPORTED_FUNCTION float   txTrack_calcMeasAccuracy(int32_t efProbe, int32_t nProbes, float EhNo)
26  {
```

```
27      bool isEFProbe;
28      isEFProbe = (efProbe != 0);
29      return txTrackPtr->calcMeasAccuracy(isEFProbe, nProbes, EhNo);
30   }
31
32   EXPORTED_FUNCTION void  txTrack_update(double *results, int32_t detected, int32_t isLate,
33      int32_t efProbe, int32_t errMag, float measAcc)
34   {
35      bool probeDetected = (detected != 0);
36      bool probeLate = (isLate != 0);
37      bool isEFProbe = (efProbe != 0);
38      float timeMove;
39      float timeRate;
40
41      txTrackPtr->update(probeDetected, probeLate, isEFProbe, errMag, measAcc, timeMove, timeRate);
42      results[0] = timeMove;
43      results[1] = timeRate;
44   }
45
46   EXPORTED_FUNCTION float  txTrack_getAccuracy()
47   {
48      return txTrackPtr->getTimeAccuracy();
49   }
50
51
52
53
54   // This class is a holder to manage tracking loops on multiple terminals in a simulation
55
56   const int32_t MAX_HOPS = HOPS_PER_FRAME;
```

```
57
58  class trackLoopHolder
59  {
60  public:
61      trackLoopHolder();  // constructor
62      ~trackLoopHolder(); // destructor
63
64      void addTimeErrorMeasurement(float timeErr, float accuracy);
65      void addFreqErrorMeasurement(float freqErr, float accuracy);
66      void loadHwMeasurements();
67
68      TrackingLoop tLoop;
69      uint32_t hwMeasurmentCount;
70      hwTimeErrEstimate_t hwMeasurements[2 * MAX_HOPS];
71  };
72
73  uint32_t tLoopIndex = 0;
74  trackLoopHolder TLH[10];
75
76  trackLoopHolder::trackLoopHolder()
77  {
78      hwMeasurmentCount = 0;
79  }
80
81  trackLoopHolder::~trackLoopHolder()
82  {
83      // no action for destructor
84  }
85
86  void trackLoopHolder::addTimeErrorMeasurement(float timeErr, float accuracy)
87  {
88      if (hwMeasurmentCount < 2 * MAX_HOPS)
89      {
```

```
 90        hwMeasurements[hwMeasurmentCount].timeEstNs = timeErr;
 91        hwMeasurements[hwMeasurmentCount].timeEstAccNs = accuracy;
 92        hwMeasurements[hwMeasurmentCount].timeEstValid = true;
 93        hwMeasurements[hwMeasurmentCount].freqEstValid = false;
 94        hwMeasurmentCount++;
 95      }
 96  }
 97
 98  void trackLoopHolder::addFreqErrorMeasurement(float freqErr, float accuracy)
 99  {
100      if (hwMeasurmentCount < 2 * MAX_HOPS)
101      {
102        hwMeasurements[hwMeasurmentCount].freqEstHz = freqErr;
103        hwMeasurements[hwMeasurmentCount].freqEstAccHz = accuracy;
104        hwMeasurements[hwMeasurmentCount].freqEstValid = true;
105        hwMeasurements[hwMeasurmentCount].timeEstValid = false;
106        hwMeasurmentCount++;
107      }
108  }
109
110  void trackLoopHolder::loadHwMeasurements()
111  {
112      tLoop.loadHwMeasurements(hwMeasurements, hwMeasurmentCount);
113      hwMeasurmentCount = 0;
114  }
115
116  EXPORTED_FUNCTION void   tLoop_getMeasurementSpace(double * measSpace)
117  {
118      double *inPtr;
119      double *outPtr;
120      int32_t i;
121
```

```
122     TLH[tLoopIndex].tLoop.updateMeasurementSpace();
123     inPtr = TLH[tLoopIndex].tLoop.measurementSpace;
124     outPtr = measSpace;
125     for (i = 4; i > 0; i--)
126     {
127        *outPtr++ = *inPtr++;
128     }
129  }
130
131  EXPORTED_FUNCTION void select_tLoop(uint32_t index)
132  {
133     if (index < 10)
134     {
135        tLoopIndex = index;
136     }
137     else
138     {
139        tLoopIndex = 0;
140     }
141  }
142
143  // Hardware measurments will be passed one at a time to the library. After all
144  // entries have been made, the measurements can be processed by the tracker
145
146  EXPORTED_FUNCTION void   tLoop_clearMeasurements()
147  {
148     TLH[tLoopIndex].hwMeasurmentCount = 0;
149  }
150
151  EXPORTED_FUNCTION void   tLoop_adjustRates(float rateAdjustment)
152  {
153     TLH[tLoopIndex].tLoop.adjustRates(rateAdjustment);
154  }
```

```
155
156   EXPORTED_FUNCTION void   tLoop_increaseSigma(float delta)
157   {
158       TLH[tLoopIndex].tLoop.increaseSigma(delta);
159   }
160
161   EXPORTED_FUNCTION void   tLoop_addTimeErrorMeasurement(float
      timeErr, float accuracy)
162   {
163       TLH[tLoopIndex].addTimeErrorMeasurement(timeErr, accuracy);
164   }
165
166   EXPORTED_FUNCTION void   tLoop_addFreqErrorMeasurement(float
      freqErr, float accuracy)
167   {
168       TLH[tLoopIndex].addFreqErrorMeasurement(freqErr, accuracy);
169   }
170
171   EXPORTED_FUNCTION void tLoop_setInitialAcc(double * accuracy)
172   {
173       TLH[tLoopIndex].tLoop.setInitialAcc(accuracy);
174   }
175
176   EXPORTED_FUNCTION void   tLoop_init(int32_t platform, float ctrFreq, float
      initialTimeRate)
177   {
178       TLH[tLoopIndex].tLoop.init((platformEnum) platform, ctrFreq,
      initialTimeRate);
179   }
180
181   EXPORTED_FUNCTION void   tLoop_apHandOff(float timeRateNsPerFrame)
182   {
183       TLH[tLoopIndex].tLoop.apHandOff(timeRateNsPerFrame);
```

```
184  }
185
186  EXPORTED_FUNCTION void   tLoop_loadHwMeasurements()
187  {
188      TLH[tLoopIndex].loadHwMeasurements();
189  }
190
191  EXPORTED_FUNCTION void   tLoop_setHubless(int32_t propDelayFrames,
         int32_t isMaster)
192  {
193      TLH[tLoopIndex].tLoop.setPropDelay(propDelayFrames);
194      TLH[tLoopIndex].tLoop.setHublessMaster(isMaster != 0);
195  }
196
197  EXPORTED_FUNCTION void   tLoop_processLoop(double * timeUpdate,
         double *accuracy)
198  {
199      timeUpdate_t lclUpdate;    // returns time and time rate outputs applied to FW next frame
200      timeUpdate_t txUpdate;
201      accuracy_t   lclAccuracy;  // returns 3 sigma estimated accuracy of tracking loop
202
203      lclUpdate.frameID = 0;
204
205      TLH[tLoopIndex].tLoop.processLoop(lclUpdate, txUpdate, lclAccuracy);
206      timeUpdate[0] = lclUpdate.timeAdjNs;
207      timeUpdate[1] = lclUpdate.timeRateNsPerFrame;
208      timeUpdate[2] = lclUpdate.freqHz;
209      accuracy[0] = lclAccuracy.timeAccuracyNs;
210      accuracy[1] = lclAccuracy.freqAccuracyHz;
211  }
212
```

```
213  EXPORTED_FUNCTION void   tLoop_processLoop2(double *rxTimeUpdate,
     double *txTimeUpdate, double *accuracy, unsigned long *frameID)
214  {
215      timeUpdate_t lclUpdate;     // returns time and time rate outputs applied to FW next frame
216      timeUpdate_t txUpdate;
217      accuracy_t   lclAccuracy;   // returns 3 sigma estimated accuracy of tracking loop
218      lclUpdate.frameID = *frameID;
219      TLH[tLoopIndex].tLoop.processLoop(lclUpdate, txUpdate, lclAccuracy);
220      frameID[1] = txUpdate.frameID;
221      rxTimeUpdate[0] = lclUpdate.timeAdjNs;
222      rxTimeUpdate[1] = lclUpdate.timeRateNsPerFrame;
223      rxTimeUpdate[2] = lclUpdate.freqHz;
224      accuracy[0] = lclAccuracy.timeAccuracyNs;
225      accuracy[1] = lclAccuracy.freqAccuracyHz;
226      txTimeUpdate[0] = txUpdate.timeAdjNs;
227      txTimeUpdate[1] = txUpdate.timeRateNsPerFrame;
228      txTimeUpdate[2] = txUpdate.freqHz;
229  }
```

What is claimed is:

1. A method for transmitting packets from a transceiver to a repeater in the presence of relative motion between the transceiver and the repeater, the method comprising:
   transmitting a first synchronization packet from the transceiver to the repeater;
   transmitting a second synchronization packet from the transceiver to the repeater;
   receiving the first synchronization packet, by the transceiver, from the repeater;
   receiving the second synchronization packet, by the transceiver, from the repeater;
   adjusting a third transmission time, based on:
      the time elapsed between the transmitting of the first synchronization packet from the transceiver to the repeater and the receiving of the first synchronization packet, by the transceiver, from the repeater, and
      the time elapsed between the transmitting the second synchronization packet from the transceiver to the repeater and the receiving the second synchronization packet, by the transceiver, from the repeater; and
   transmitting a third synchronization packet from the transceiver to the repeater at the adjusted third transmission time,
   the adjusting of the third transmission time reducing the difference between the time the third synchronization packet is received at the repeater and the time at which the third synchronization packet would have been received at the repeater in the absence of:
      the relative motion, and
      the adjusting.

2. The method of claim 1, wherein the receiving of the first synchronization packet, by the transceiver, from the repeater, occurs after the transmitting of the second synchronization packet from the transceiver to the repeater.

3. The method of claim 2, wherein the adjusting of the third transmission time comprises:
   predicting the time of receipt of the third synchronization packet by the transceiver from the repeater, in the absence of the adjusting of the third transmission time; and
   adjusting the third transmission time by a fraction, less than one, of the difference between the predicted time of receipt of the third synchronization packet and the time at which the third synchronization packet would have been received in the absence of:
      the relative motion, and
      the adjusting.

4. The method of claim 3, wherein the adjusting of the third transmission time comprises adjusting the third transmission time in accordance with the equation $$t_{t3} = t_{m0} - \tfrac{1}{2}(t_{r3e} - t_{r30})$$

wherein:
   $t_{t3}$ is the adjusted third transmission time,
   $t_{t30}$ is the unadjusted third transmission time,
   $t_{r3e}$ is the predicted time of receipt of the third synchronization packet by the transceiver from the repeater, if transmitted at the unadjusted third transmission time, and
   $t_{r30}$ is the time at which the third pulse would be received in the absence of:
      the relative motion, and
      the adjusting.

5. The method of claim 3, wherein the predicting of the time of receipt of the third synchronization packet by the transceiver from the repeater comprises:
   estimating, with an estimator, a plurality of elements of a state vector, based on:
      the time elapsed between the transmitting of the first synchronization packet from the transceiver to the repeater and the receiving of the first synchronization packet, by the transceiver, from the repeater, and
      the time elapsed between the transmitting the second synchronization packet from the transceiver to the repeater and the receiving the second synchronization packet, by the transceiver, from the repeater; and
   predicting the time of receipt of the third synchronization packet by the transceiver from the repeater based on one or more elements of the state vector,
   the elements of the state vector being parameters of a model of the relative motion.

6. The method of claim 5, wherein the estimator is a Kalman filter.

7. The method of claim 6, wherein the adjusting of the third transmission time comprises adjusting a rate of a transmit clock of the transceiver.

8. The method of claim 1, further comprising:
   adjusting a fourth transmission time; and
   transmitting a data packet from the transceiver to the repeater at the fourth transmission time,
   the adjusting of the fourth transmission time reducing the difference between the time the data packet is received at the transceiver and the time at which the data packet would have been received in the absence of:
      the relative motion, and
      the adjusting.

9. The method of claim 8, wherein the adjusting of the fourth transmission time comprises adjusting a rate of a transmit clock of the transceiver.

10. A system for transmitting packets from a transceiver to a repeater in the presence of relative motion between the transceiver and the repeater, the system comprising:
   a transceiver; and
   a repeater,
   the transceiver comprising a processing circuit configured to:
      cause the transceiver to transmit a first synchronization packet to the repeater;
      cause the transceiver to transmit a second synchronization packet to the repeater; and
      after:
         receiving the first synchronization packet, by the transceiver, from the repeater; and
         receiving the second synchronization packet, by the transceiver, from the repeater:
      adjust a third transmission time, based on:
         the time elapsed between the transmitting of the first synchronization packet from the transceiver to the repeater and the receiving of the first synchronization packet, by the transceiver, from the repeater,
         the time elapsed between the transmitting the second synchronization packet from the transceiver to the repeater and the receiving the second synchronization packet, by the transceiver, from the repeater; and
      cause the transceiver to transmit a third synchronization packet from the transceiver to the repeater at the adjusted third transmission time, the adjusting of the third transmission time reducing the difference between the time the third synchronization packet is received at the repeater and the time at which the third synchronization packet would have been received at the repeater in the absence of:
the relative motion, and
the adjusting.

11. The system of claim 10, wherein the receiving of the first synchronization packet, by the transceiver, from the repeater, occurs after the transmitting of the second synchronization packet from the transceiver to the repeater.

12. The system of claim 11, wherein the adjusting of the third transmission time comprises:
predicting the time of receipt of the third synchronization packet by the transceiver from the repeater, in the absence of the adjusting of the third transmission time; and
adjusting the third transmission time by a fraction, less than one, of the difference between the predicted time of receipt of the third synchronization packet and the time at which the third synchronization packet would have been received in the absence of:
the relative motion, and
the adjusting.

13. The system of claim 12, wherein the adjusting of the third transmission time comprises adjusting the third transmission time in accordance with the equation $t_{t3} = t_{m0} - \frac{1}{2}(t_{r3e} - t_{r30})$ wherein:
$t_{t3}$ is the adjusted third transmission time,
$t_{t30}$ is the unadjusted third transmission time,
$t_{r3e}$ is the predicted time of receipt of the third synchronization packet by the transceiver from the repeater, if transmitted at the unadjusted third transmission time, and
$t_{r30}$ is the time at which the third pulse would be received in the absence of:
the relative motion, and
the adjusting.

14. The system of claim 12, wherein the predicting of the time of receipt of the third synchronization packet by the transceiver from the repeater comprises:
estimating, with an estimator, a plurality of elements of a state vector, based on:
the time elapsed between the transmitting of the first synchronization packet from the transceiver to the repeater and the receiving of the first synchronization packet, by the transceiver, from the repeater, and
the time elapsed between the transmitting the second synchronization packet from the transceiver to the repeater and the receiving the second synchronization packet, by the transceiver, from the repeater; and
predicting the time of receipt of the third synchronization packet by the transceiver from the repeater based on one or more elements of the state vector,
the elements of the state vector being parameters of a model of the relative motion.

15. The system of claim 14, wherein the estimator is a Kalman filter.

16. The system of claim 15, wherein the adjusting of the third transmission time comprises adjusting a rate of a transmit clock of the transceiver.

17. The system of claim 10, wherein the processing circuit is further configured to:
adjust a fourth transmission time; and
cause the transceiver to transmit a data packet from the transceiver to the repeater at the fourth transmission time,
the adjusting of the fourth transmission time reducing the difference between the time the data packet is received at the transceiver and the time at which the data packet would have been received in the absence of:
the relative motion, and
the adjusting.

18. The system of claim 17, wherein the adjusting of the fourth transmission time comprises adjusting a rate of a transmit clock of the transceiver.

* * * * *